US011368450B2

(12) United States Patent
Liu et al.

(10) Patent No.: US 11,368,450 B2
(45) Date of Patent: Jun. 21, 2022

(54) METHOD FOR BIDIRECTIONAL AUTHORIZATION OF BLOCKCHAIN-BASED RESOURCE PUBLIC KEY INFRASTRUCTURE

(71) Applicant: GUANGZHOU UNIVERSITY, Guangzhou (CN)

(72) Inventors: Yaping Liu, Guangzhou (CN); Shuo Zhang, Guangzhou (CN); Binxing Fang, Guangzhou (CN); Peng Sun, Guangzhou (CN); Qingyuan Li, Guangzhou (CN); Yifei Zhou, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 113 days.

(21) Appl. No.: 17/100,812

(22) Filed: Nov. 20, 2020

(65) Prior Publication Data
US 2021/0160067 A1 May 27, 2021

(30) Foreign Application Priority Data
Nov. 25, 2019 (CN) .......................... 201911168985.8

(51) Int. Cl.
*H04L 29/06* (2006.01)
*H04L 9/40* (2022.01)
*H04L 9/30* (2006.01)
*H04L 9/32* (2006.01)

(52) U.S. Cl.
CPC ............ *H04L 63/0823* (2013.01); *H04L 9/30* (2013.01); *H04L 9/3268* (2013.01)

(58) Field of Classification Search
CPC .................................................. H04L 63/0823
See application file for complete search history.

(56) References Cited

U.S. PATENT DOCUMENTS

| 9,641,327 B2 | 5/2017 | Nix |
| 2004/0268120 A1 | 12/2004 | Mirtal et al. |
| 2010/0070755 A1 | 3/2010 | Himawan et al. |

(Continued)

FOREIGN PATENT DOCUMENTS

| CN | 108876618 A | 11/2018 |
| CN | 111352770 A | 6/2020 |

*Primary Examiner* — Bradley W Holder

(57) ABSTRACT

The disclosure discloses a method for bidirectional authorization of a blockchain-based resource public key infrastructure, aiming at solving security threat problems that a legal BGP route is illegal and a legal IP address is blocked caused by malicious operations. A technical solution is as follows: constructing a blockchain-based resource public key infrastructure system RPKIB composed of a resource issuer, a resource transaction application client, a resource receiver and a blockchain network; changing any operation of issuing, revoking, overwriting and modifying of a resource certificate by the resource issuer into a bidirectional authorization mode, and implementing the operation of the resource certificate only when the issuer and the receiver both agree; and carrying out, by the issuer, operations of a resource certificate RC and route origin authorization ROA as transactions that are carried out through the blockchain network, and distinguishing whether the operations are malicious behaviors or normal operations.

13 Claims, 4 Drawing Sheets

(56) References Cited

U.S. PATENT DOCUMENTS

| | | | |
|---|---|---|---|
| 2018/0006826 A1* | 1/2018 | Smith | H04L 9/006 |
| 2018/0183587 A1* | 6/2018 | Won | H04W 12/0433 |
| 2019/0163912 A1* | 5/2019 | Kumar | H04L 9/3297 |
| 2019/0220603 A1* | 7/2019 | Gopalakrishnan | H04L 9/006 |

* cited by examiner

METHOD FOR BIDIRECTIONAL AUTHORIZATION OF BLOCKCHAIN-BASED RESOURCE PUBLIC KEY INFRASTRUCTURE

CROSS REFERENCES TO RELATED APPLICATIONS

The present application claims foreign priority of Chinese Patent Application No. 201911168985.8, filed on Nov. 25, 2019 in the State Intellectual Property Office of China, the disclosures of all of which are hereby incorporated by reference.

TECHNICAL FIELD

The disclosure belongs to the field of network information security, and more particularly, to a method for bidirectional authorization of a Resource Public Key Infrastructure RPKI for improving security of the RPKI.

BACKGROUND

A BGP (Border Gateway Protocol) is an inter-domain routing protocol in the Internet. However, traditional BGP protocols are vulnerable to many security threat attacks, and one of the most common BGP attacks is prefix hijacking. Traffic corresponding to these IP address prefixes is intercepted or discarded by an AS of a hijacker by forging an origin AS (Autonomous system) in route advertisement information of the BGP, wherein the origin AS refers to an AS initiating the route advertisement information. A Resource Public Key Infrastructure (RPKI) is an infrastructure used for supporting origin validation of the IP address prefix, which can provide trusted mapping between an authorized IP address prefix and the origin AS. An IP address is equal to a network address plus a host address, the IP address prefix refers to an address part corresponding to a network part in the IP address, i.e., the network address of the IP address, which is used for uniquely identifying a network number of a network connected to the Internet. IP address={<address prefix>, <host number>}. To distinguish the address prefixes, "slash notation" is usually employed, i.e., a number of bits occupied by the IP address/network prefix. For example, 192.168.24.0/22 denotes that in a 32-bit address, the first 22 bits denote the network prefix, while the last 10 bits (32−22=10) denote the host number. In conversion, a binary system corresponding to 192.168.24.0/22 is:

1100 0000(192), 1010 1000(168), 0001 1000(24), 0000 0000(0)

The RPKI is dependent to a distribution process of INRs (Internet Numbers Resources), the INRs (Internet Numbers Resources) include an IP address resource and an AS number resource, i.e., an IP address and an AS number possessed by an institution. A Regional Internet Registry (RIR) is used as a top-level resource issuer. The RIR may also allocate an Internet number resource thereof to a lower-level resource issuer, such as a Local Internet Registry (LIR), a National Internet Registry (NIR) and an Internet Service Provider (ISP). Then, the lower-level resource issuer allocates the Internet number resource downwardly level by level in sequence, and provides a verifiable mapping library between the IP address prefix and the origin AS through a top-down authority hierarchy. The RPKI is composed of three components: a certificate object based on a public key infrastructure, a signature object used for representing Route Origin Authorization (ROA), and a distributed storage system used for saving objects. An RP (Relying Party) is a user of the RPKI, and the RP acquires a copy of a signature object collection, validates the signature, generates an effective ROA list, periodically checks overwriting of the signature object in the distributed storage system, and synchronizes these overwriting. The ROA is authorization information from an IP address possessor that authorizes the AS to carry out route advertisement for the IP address possessor, which contains an AS number and a "binding relationship" between one or more IP address prefixes.

The ROA may be used by the RP to verify whether an AS initiating routing for a specific IP address prefix is authorized by the address. A router of the BGP distinguishes a BGP routing initiated by a legal origin AS from a BGP routing that may be hijacked by using effective ROA list information provided by the RP in the RPKI. A BGP router uses effective ROA list information provided by the RP in the RPKI to distinguish BGP routes initiated by a legal origin AS from BGP routes that may be hijacked.

However, the RPKI itself also faces security risks. Although how the RPKI validates the BGP route is discussed in many RPKI specifications, whether the RPKI can run correctly depends on whether the RP can provide correct, comprehensive and effective ROA information. A major security problem of the RPKI itself is that: a malicious authority may carry out malicious operations on various Resource Certificates (RC) on the RPKI (contents of the RCs include an X.509 certificate of standard RFC 5280, as well as an IP address and an AS extended identifier of RFC 3779, which are used for guaranteeing allocation of the IP address prefix and the AS number), resulting in some legal BGP routes being illegal. Alternatively, the malicious authority manipulates different resource certificate views to different RPs, so as to achieve the purpose of illegally attracting traffic by blocking some legal IP addresses or redirecting the legal IP addresses to different forwarding paths at a route forwarding level. In view of the above problems, it is difficult for the current RPKI to distinguish whether operations of various resource certificate objects are attacked malicious behaviors caused by operation mistakes of an institution administrator, or normal contracts reached between a resource certificate issuer and a resource certificate receiver. It is difficult for the existing RPKI architecture and mechanism to solve the above security problems.

Bidirectional authorization is a secure process. When operating a resource, both a client and a server need to authorize the operation before actual operation, which makes the operation safer and more reliable. However, there is no bidirectional authorization process in the RPKI at present, and an operation carried out by a resource issuer on the certificate resource in the RPKI is not authorized by a resource receiver, which leads to that a malicious resource issuer may carry out malicious operations on various resource certificates, and results in that some originally illegal routes become illegal. Therefore, how to authorize the operations of the issuer and the receiver to determine whether an identity of the resource issuer is legal so as to improve the security of the RPKI is a technical problem to be solved by the RPKI at present.

A blockchain is generally used for solving a trust problem caused by centralization. In 2008, Satoshi Nakamoto proposed the blockchain as an underlying technology of Bitcoin in Article Bitcoin: A Peer-to-Peer Electronic Cash System. The blockchain is formed by a plurality of blocks (a first block is stipulated to be called a foundation block) which are connected in a timestamp order of generating a transaction. One block is divided into two parts: a block head and a block body. Head information of the block is stored in the block head, which contains a hash value of a previous block, a hash value of this block body, a block ID and a timestamp, and detailed data of this block is stored in the block body, where the data contains a plurality of lines of transaction information. The blockchain is generally used for solving node dependence problems. As a decentralization technology, the blockchain allows both parties of a transaction to trade directly online without going through a third-party management institution. Without central control, all the nodes can automatically and safely verify and exchange in a system. The blockchain technology places trustfulness in the network rather than a central authority. A terminal responsible for maintaining the network to operate may be called-node. The blockchain is a decentralized distributed database, which does not depend on any centralized server, but consists of numerous "small servers". As long as the server is installed with a blockchain client, the server becomes one of the numerous "small servers", and then the server is one node.

There has been no published literature relating to the use of the blockchain to realize bidirectional authorization of issuer and receiver operations to solve the inherent security problems of the RPKI.

Therefore, how to overcome the malicious operation of the malicious resource issuers on various resource certificates RCs and the security threats of some legal IP address blocked or redirected to different forwarding paths at the route forwarding level faced by the current RPKI is a technical problem of great concern to those skilled in the art.

SUMMARY

A technical problem to be solved by the disclosure is to provide a blockchain method for bidirectional authorization of a blockchain-based resource public key infrastructure to solve the current security threat problems of illegal BGP routes, blocked legal IP address or maliciously blocked corresponding traffic caused by malicious operations of malicious resource issuers faced by the current RPKI.

A technical solution of the disclosure is as follows: changing a working framework of the current RPKI, changing any operation of issuing, revoking, overwriting and modifying on resource certificates by a resource issuer into a bidirectional authorization mode, and implementing the operation of the resource certificates only on the basis that both a issuer and a receiver of the resource certificates agree; designing the operation of the resource certificate and route origin authorization ROA as a transaction, wherein the operation of the resource certificate and the route origin authorization ROA are taken as a transaction and carried out by the issuer through a blockchain platform. The assumption of completely trusting any type of node is eliminated through a blockchain mechanism, and whether an operation is a malicious behavior of an authority or a normal operation is distinguished by bidirectional authorization.

The disclosure includes the following steps.

In step 1, a blockchain-based resource public key infrastructure system (RPKI Blockchain) is constructed, which is composed of a resource issuer, a resource transaction application client, a resource receiver and a blockchain network.

The blockchain network is a decentralized system. Each node in the blockchain network is peer-to-peer, and the peer-to-peer nodes can both server as an issuer and a receiver. The blockchain network eliminates dependence of an original RPKI on a central node through a decentralization mechanism, and the blockchain network is connected with the resource issuer, the resource receiver and the resource transaction application client. The resource issuer and the resource receiver serve as a node of the blockchain network after being connected with the blockchain network, and the resource transaction application client is installed on the node where the resource issuer and the resource receiver are located. The resource transaction application client takes various operations of the resource certificate and the route origin authorization ROA as transactions that are carried out through the blockchain network, and saves transaction records in a distributed ledger. The distributed ledger exists in all blockchain nodes.

The resource receiver is a server with the resource transaction application client installed thereon, and is connected with the blockchain network. The resource issuer is connected to the blockchain network, and becomes a node of the blockchain network. The resource issuer and the resource receiver serve as both parties of a transaction; after obtaining the consent of both parties (i.e., the resource issuer and the resource receiver) through bidirectional authorization, the both parties of the transaction conduct transactions through the blockchain network and record the transactions in the distributed ledger.

The resource receiver is a server with the resource transaction application client installed thereon, and is connected with the blockchain. The resource receiver is connected to the blockchain network, and becomes a node of the blockchain network.

The resource transaction application client is installed on the resource issuer and the resource receiver, and is composed of a resource transaction module, a resource certificate generating module and a display module.

The resource certificate generating module is connected with the resource transaction module; the resource certificate generating module receives pre-issued RC certificate and ROA information from the resource transaction module, and generates a resource certificate RC with the same definition as that of the RPKI according to the pre-issued RC certificate. Contents of the resource certificate RC include an X.509 certificate of standard RFC 5280, as well as an IP address and an AS extended identifier of standard RFC 3779. The resource certificate generating module creates route origin authorization (ROA) for a resource held by the resource receiver according to the pre-issued ROA information (including one AS number and one or more IP address prefixes). One effective ROA includes three parts: one AS number; one IP address prefix list; and optional contents limiting the IP address prefix. The resource certificate generating module sends the RC and the ROA generated to the resource transaction module.

The resource transaction module is connected with the resource issuer (or the resource receiver), the resource certificate generating module, the display module and the blockchain network. The resource transaction module receives the RC or the ROA from the resource certificate generating module, receives an operation instruction regarding the RC or the ROA from the resource issuer, conducts a transaction through the blockchain network, and provides various operation services of RC or ROA resource transactions for the resource issuer, for example: issuing the RC and ROA to the resource receiver; revoking the RC and ROA from the resource receiver; modifying the RC and the ROA (the ROA is modified in the case that the already given ROA extensions, i.e., the IP address prefix and the AS number need to be modified, and the modifying is realized by issuing a new certificate); and overwriting the RC (the overwriting refers to replacing an old certificate with a new certificate before the old certificate is expired. During the overwriting process of the old certificate, only avalidity of the certificate and a serial number (a serial number of the certificate) are changed. The overwriting operation of the RC only needs to change the validity and the serial number of the old certificate, and does not involve the IP address prefix and the AS number carried by the certificate. The RC modification operation involves the IP address prefix and the AS number carried by the certificate. One operation is one transaction in the RPKIB. The resource transaction module sends a transaction success message to the display module when the transaction is successful. The resource transaction module sends a conflict cause and an operation failure cause obtained by conflict detection, and a transaction result to the display module when the transaction is unsuccessful, and sends the RC and the ROA to the display module when revoking the operation.

The display module is connected with the resource transaction module, which receives the transaction success message or the conflict reason, the operation failure reason and the transaction result when the transaction is unsuccessful, from the resource transaction module, and displays the same; and receives the RC and the ROA from the resource transaction module when revoking the operation, and display specific contents of the RC and the ROA. In step 2, a resource transaction structure is defined.

The resource transaction structure includes a transaction initiator, a transaction receiver, a transaction type, a transaction content, a transaction attribute, a transaction evidence, and a transaction signature given by the transaction initiator. The transaction initiator refers to an address of the resource issuer, and the transaction receiver is an address of the resource receiver. The transaction signature refers to a digital signature for a transaction initiated by the transaction initiator in the blockchain network. Seven transaction types are provided, which are respectively: RC issuance, RC revocation, RC overwriting, RC modification, route origin authorization ROA issuance, ROA revocation and ROA modification. The transaction content is a content of the RC or the ROA corresponding to the transaction. The transaction attribute includes a transfer attribute and an expired attribute; the transfer attribute represents whether an IP address resource allocated to an institution is capable of being reallocated to another resource authorization entity, the transfer attribute being 0 indicates that the resource issuer does not want to sub-allocate an IP address prefix resource which is allocated to an institution, and the institution at the moment is called a terminal node, the IP address resource and an AS number resource possessed thereof are incapable of being reallocated, and only the terminal node is able to issue the ROA; the transfer attribute being 1 indicates that the resource issuer wants to sub-allocate an IP address prefix resource which is allocated to an institution; the expired attribute shows whether the IP address resource has a lease term, the expired attribute being 0 indicates that the lease term is not expired, while the expired attribute being 1 indicates that the lease term is expired, and the IP address resource needs to be released and returned to an original resource authorization entity. The transaction evidence indicates that the resource issuer and the resource receiver sign twice, and an evidence agreed by both parties consists of a message and a random number of transactions of both parties (for example, the transaction evidence during the RC revocation is a rc_revoke_reply message and a random number+1 published by an RC holder), which is used to overcome a risk that a legal IP address may be blocked due to a unilateral authorization protocol of the resource issuer in the current RPKI, so that attackers or violators are difficult to find. The transaction signature given by the transaction initiator shows that the transaction initiator and the transaction receiver reach an agreement on the transaction. A transaction initiator and a transaction receiver of an ROA operation are the same, so an evidence for bidirectional signature is not needed. A field of a transaction signature given by a transaction initiator of an ROA related operation is NULL.

In step 3, a resource tree is defined, wherein the resource tree is constructed by the resource transaction module according to a valid resource certificate. One node of the resource tree includes seven domains, which are respectively: the resource issuer, the resource receiver, the resource certificate, a parent certificate identifier, a child certificate identifier, an IP (Internet Protocol) address prefix contained in the certificate and an AS (Autonomous System) number contained in the certificate. The node is linked to a child node through the child certificate identifier domain, and is linked to a parent node of the node through the parent certificate identifier domain. The IP address prefix contained in the certificate and the AS number contained in the certificate are both obtained by the resource transaction module through parsing the certificate. The resource tree is saved in the distributed ledger, and is jointly maintained by the resource issuer and the resource receiver.

In step 4, the blockchain-based resource public key infrastructure system RPKIB carries out bidirectional authorization on a resource operation between the resource issuer and the resource receiver, and after each bidirectional authorization passes, the resource issuer and the resource receiver conduct a transaction corresponding to the resource operation via a method including the following steps.

In 4.1, the resource transaction module initializes a root node of the resource tree, and lets the root node be $V_0$, creates a foundation block (a first block of the blockchain) with a Regional Internet registry RIR as a creator of the blockchain, and uses a resource certificate possessed by the RIR as the root node $V_0$ of the resource tree, wherein a resource issuer and a resource receiver of the $V_0$ are both IP addresses of the RIR, a resource certificate of the $V_0$ is the resource certificate held by the RIR, a parent certificate identifier of the $V_0$ is NULL, a child certificate identifier of the $V_0$ is NULL (because the RIR does not issue a child certificate), an IP address prefix of the $V_0$ is an IP address prefix possessed by the RIR, and an AS number is an AS number possessed by the RIR; and records the $V_0$ in the distributed ledger.

In 4.2, the resource transaction module of the resource transaction application client receives a message from the resource issuer, and if a message of issuing a resource certificate RC (setting as RC1) is received, switch to 4.2.1; if a message of revoking a resource certificate RC (setting as RC2) is received, switch to 4.2.2; if a message of overwriting a resource certificate RC (setting as RC3) is received, switch to 4.2.3; if a message of modifying an RC (setting as RC4) related to resource allocation adjustment is received, switch to 4.2.4; if a message of issuing an ROA (setting as ROA1) is received, switch to 4.2.5; if a message of revoking an ROA (setting as ROA2) is received, switch to 4.2.6; and if a message of modifying an ROA (setting as ROA3) is received, switch to 4.2.7.

In 4.2.1, at the moment, the resource transaction module receives the message of issuing the RC1 from the resource issuer, the message of issuing the RC1 containing an IP address of the resource receiver (setting as $IP_{receiver\ 1}$), as well as an IP address prefix (setting as $IP_{prefix\ 1}$) and an AS number (setting as AS1) pre-issued to the resource receiver, and issues the certificate RC1 according to the certificate issuing method in 4.2.1.1 to 4.2.1.10.

In 4.2.1.1: the resource transaction module setsan RC1 issuing instruction, the RC1 issuing instruction including the $IP_{receiver\ 1}$, the $IP_{prefix\ 1}$ and the AS1.

In 4.2.1.2, the resource transaction module carries out the following operations according to contents of the RC1 issuing instruction.

In 4.2.1.2.1, the resource transaction module searches the resource tree according to the $IP_{prefix\ 1}$ and the AS1 in the RC1 issuing instruction, and checks whether the pre-issued certificate RC1 conflicts with the certificate RC already issued in the resource tree via a method including the following steps.

In 4.2.1.2.1.1, whether the pre-issued $IP_{prefix\ 1}$ and AS1 are possessed by the resource issuer (setting an IP address thereof as $IP_{issuer\ 1}$) is checked via a method including the following steps.

In 4.2.1.2.1.1.1, the resource transaction module of the resource issuer parses the self-held resource certificate $RC_{issuer}$, and obtains the IP address prefix and the AS number contained in the $RC_{issuer}$.

In 4.2.1.2.1.1.2, the resource transaction module of the resource issuer checks whether the pre-issued $IP_{prefix\ 1}$ and AS1 are contained in the IP address prefix and the AS number contained in the $RC_{issuer}$, if the pre-issued $IP_{prefix\ 1}$ and AS1 are contained in the IP address prefix and the AS number contained in the $RC_{issuer}$, the pre-issued $IP_{prefix\ 1}$ and AS1 is possessed by the resource issuer, and no conflict occurs, switch to 4.2.1.2.1.2; and if the pre-issued $IP_{prefix\ 1}$ and AS1 are not contained in the $RC_{issuer}$, the pre-issued $IP_{prefix\ 1}$ and AS1 is possessed by the resource issuer, and a conflict occurs, switch to 4.2.1.2.1.3;

in 4.2.1.2.1.2, whether the $IP_{prefix\ 1}$ and the AS1 contained in the pre-issued certificate RC1 are already issued is checked, i.e., whether the IP address prefix and the AS number contained in the resource certificate already issued by the resource issuer include the $IP_{prefix\ 1}$ and the AS1 is checked, if a checking result is "not issued", switch to 4.2.1.3; and if a checking result is that "the pre-issued $IP_{prefix\ 1}$ and AS1 are already issued, resulting in a conflict", switch to 4.2.1.2.1.4, wherein a specific method includes the following steps.

In 4.2.1.2.1.2.1, let the node variable $v=V_0$.

In 4.2.1.2.1.2.2, the value in the child certificate identifier domain of the v is checked; if the value is NULL, the checking result is "not issued"; then, switch to 4.2.1.3; if the value is not NULL, a node where the resource issuer is located is found via a method including: obtaining the child node v1 by the value in the child certificate identifier domain of the v, determining whether the value of the resource certificate domain of the v1 is just the RC1 held by the resource issuer; if the values are equal, the node v1 is the node where the resource issuer is located, switch to 4.2.1.2.1.2.4; if the values are not equal, switch to 4.2.1.2.1.2.3.

In 4.2.1.2.1.2.3, let v=v1, and switch to 4.2.1.2.1.2.2.

In 4.2.1.2.1.2.4, a child node v2 of the v1 is obtained through the child certificate identifier domain of the node v1, the resource transaction module of the resource issuer parses a resource certificate RCv2 held by the child node v2, whether an IP address prefix and an AS number contained in the RCv2 are overlapped with the pre-issued $IP_{prefix\ 1}$ and AS1 are checked by comparison; if overlapped, indicating that the pre-issued $IP_{prefix\ 1}$ and AS1 are already issued, a conflict occurs, and a checking result is that "the pre-issued $IP_{prefix\ 1}$ and AS1 are already issued, resulting a conflict", switch to 4.2.1.2.1.4; if not overlapped, indicating that the pre-issued $IP_{prefix\ 1}$ and AS1 are not issued, and a checking result is "not issued", switch to 4.2.1.3.

In 4.2.1.2.1.3, the resource transaction module sends a "resource conflict" message to the display module, and the display module displays the "resource conflict" message, wherein the message contains a resource conflict cause (the resource conflict cause is that the IP address prefix resource and the AS number contained in the pre-issued certificate RC are not possessed by a current certificate issuer); then, switch to step 5.

In 4.2.1.2.1.4, the resource transaction module sends a "resource conflict" message to the display module, and the display module displays the "resource conflict" message, wherein the message contains a resource conflict cause (the resource conflict cause is that the IP address prefix and the AS number contained in the pre-issued RC certificate are already issued); then, switch to 4.2.1.2.2.

In 4.2.1.2.2, the resource transaction module checks whether an instruction of "abandoning the transaction" is received from the resource issuer, and if the instruction is received, switch to step 5; otherwise, switch to 4.2.1.2.3.

In 4.2.1.2.3, the resource transaction module determines whether a revocation message (revoking an issued resource conflicting with the pre-issued RC1) is received from the resource issuer, and if the revocation message is received, revokes the issued RC conflicting with the pre-issued RC1; and if the revocation message is not received, switch to step 5.

In 4.2.1.3, the resource transaction module sends the $IP_{prefix\ 1}$ and the AS1 in the RC1 issuing instruction to the resource certificate generating module; then, switch to 4.2.1.4.

In 4.2.1.4, the resource certificate generating module generates a resource certificate according to the $IP_{prefix\ 1}$ and the AS1 received from the resource transaction module, and names the certificate as RC1.

In 4.2.1.5, the resource issuer and the resource receiver of the RC1 carry out bidirectional authorization, wherein the details are as follows.

In 4.2.1.5.1, the resource transaction module of the resource issuer of the RC1 constructs an RC1 issuance request message rc_issue_request based on a UDP (User Datagram Protocol), and sends the rc_issue_request to the resource transaction module of the resource receiver through the blockchain network, wherein contents of the reissue-request include an issued certificate (RC1 here), a parent certificate identifier (certificate possessed by the resource issuer), a random number r, and the address of the resource receiver. The resource issuer of the RC1 initializes a number of resending times m to be 0, starts an issuance request sending timer corresponding to the RC1, and waits for receiving an RC1 issuance request reply message from the resource receiver.

In 4.2.1.5.2, the resource issuer of the RC1 checks whether the issuance request sending timer is overtime, and if the issuance request sending timer is not overtime, switch to 4.2.1.5.3; if the issuance request sending timer is overtime, and m is less than a maximum number of resending times M (M is a positive integer, and M is less than or equal to 16), m is increased by 1, the rc_issue_request is resent to the resource receiver, the issuance request sending timer corresponding to the RC1 is restarted; and switch to 4.2.1.5.3; if the issuance request sending timer is overtime and m is equal to M, the issuance request is failed, the resource issuer deletes the RC, and the resource transaction module sends operation failure and an operation failure cause (the cause is overtime sending) to the display module for display; then, switch to step 5.

In 4.2.1.5.3, the resource issuer of the RC1 determines whether the issuance request reply message rc_issue_reply is received from the resource receiver, wherein contents of the rc_issue_reply include a received message (rc_issue_request), whether an operation of the resource issuer is agreed, and a random number; if the rc_issue_reply is not received, the resource transaction module of the resource issuer of the RC1 sends a failure message and an operation failure cause (the cause is that the issuance request reply message sent from the resource receiver is not received) to the display module; then, switch to step 5; if the rc_issue_reply is received, a format and a content of the rc_issue_reply is checked, if the format is wrong, the rc_issue_repl is discarded, the resource transaction module sends a failure message and an operation failure cause (the cause is that the format of the issuance request reply message is wrong) to the display module; then, switch to step 5; if the format is correct, the content of the rc_issue_reply message are checked, if the content is to reject the issuance, the resource issuer deletes the RC1, and meanwhile, the resource issuer sends an operation failure message and an operation failure cause (the cause is that the resource receiver disagrees to issue the certificate) to the display module of the resource transaction application client, the display module displays the operation failure message and the operation failure cause; then, switch to step 5; and if the content in the rc_issue_reply is to agree the issuance operation request, execute 4.2.1.6.

In 4.2.1.6, the resource transaction module of the resource issuer constructs an issuance transaction message rc_issue of the RC1 according to the resource transaction structure, wherein contents of the rc_issue_request include the resource issuer (the issuer of the RC), the resource receiver (the receiver of the RC1), the transaction type (the RC1 issuance), the transaction content (the specific content of the RC1), the transaction attributes (including the transfer attribute and the expired attribute), the transaction evidence (the rc_issue_reply message, and a random number+1 issued by the receiver of the RC), and a signature of the resource issuer of the RC1 on the transaction (the transaction signature is to encrypt transaction information by a digital signature technology, which is an effective proof of authenticity of the information sent by the transaction initiator); and the resource issuer sends the rc_issue to the resource receiver through the blockchain network.

In 4.2.1.7, if the resource transaction module of the resource receiver receives the rc_issue sent from the resource issuer and obtains a specific transaction content, i.e., the resource certificate RC1, from a transaction content domain of the rc_issue, the transaction is successful. The resource transaction module of the resource receiver records the transaction into the distributed ledger, and the resource transaction module of the resource receiver creates a new node (named as an RC1 node), for the resource tree via a method including the following steps.

In 4.2.1.7.1, information of a parent node of the RC1 node, i.e., the node where the certificate $RC_{issuer}$ held by the resource issuer is located is overwritten, and a child certificate identifier is added to the child certificate identifier domain, wherein the child certificate identifier points to the new node RC1.

In 4.2.1.7.2, the new node RC1 is created and information of each domain is filled in: a resource issuer domain of the RC1 node is the IP address $IP_{issuer\ 1}$ of the resource issuer of the RC1, a resource receiver domain is the IP address $IP_{receiver\ 1}$ of the resource receiver of the RC1, a content of the resource certificate domain is the RC1, and the parent certificate identifier domain points to the node where the resource certificate RC held by the resource issuer of the RC1 is located, the child certificate identifier domain is NULL, the child certificate is not issued to the current node, and the IP address prefix and the AS number contained in the certificate are obtained by parsing the RC1 via the resource transaction module.

In 4.2.1.7.3, a transaction success message is sent to the resource transaction module of the resource issuer; then, switch to 4.2.1.9.

In 4.2.1.8, if the resource transaction module of the resource receiver does not receive the rc_issue or the transaction content obtained from the transaction content domain of the rc_issue is not the resource certificate RC1, a transaction failure message is sent to the resource transaction module of the resource issuer; then, switch to 4.2.1.10.

In 4.2.1.9, if the resource transaction module of the resource issuer of the RC1 receives the transaction success message sent from the resource transaction module of the resource receiver, the resource transaction module of the resource issuer of the RC1 sends the "transaction success" message to the display module, the display module displays the "transaction success"; then, switch to step 5.

In 4.2.1.10, if the resource transaction module of the resource issuer of the RC1 receives the transaction failure message sent from the resource transaction module of the resource receiver, the resource issuer of the RC1 deletes the node where the certificate RC1 is located in the resource tree, and meanwhile, the resource transaction module of the RC1 sends an "operation failure" message and an operation failure cause (the cause is that the certificate RC1 is not received correctly) to the display module, the display module displays the "operation failure" message and the operation failure cause; then, switch to step 5.

In 4.2.2, at the moment, the resource transaction module of the resource transaction application client receives a message of revoking the RC (setting as RC2) from the resource issuer, wherein the message of revoking the RC2 includes a holder of the resource certificate RC (serving as the resource receiver) and the pre-revoked resource certificate RC, and revokes the certificate RC2 according to the certificate revoking method in 4.2.2.1 to 4.2.2.7.

In 4.2.2.1, the resource transaction module of the resource issuer sets an instruction of revoking the RC2 according to the message of revoking the RC2, wherein the instruction of revoking the RC2 includes the holder of the resource certificate RC and the pre-revoked resource certificate RC2, and sends a specific content of the RC2 to the display module, and the display module displays the specific content of the RC2.

In 4.2.2.2, the resource issuer and the holder of the pre-revoked certificate RC2 (serving as the resource receiver) execute bidirectional authorization via a method including the following steps.

In 4.2.2.2.1, the resource transaction module of the resource issuer checks whether a node where the certificate RC2 is located (setting as $V_{rc2}$), belongs to a leaf node in the resource tree via a method including the following steps.

In 4.2.2.2.1.1, let a variable node v be the root node $V_0$ of the resource tree.

In 4.2.2.2.1.2, the node $V_{rc2}$ is found via a method including: obtaining a child node v1 from a value in a child certificate identifier domain of v, and determining whether a value of a resource certificate domain of the v1 is namely the RC2 held by the resource issuer, if the value is equivalent to the RC2, the node v1 being namely the $V_{rc2}$, switching to 4.2.2.2.1.4, and if the value is not equivalent to the RC2, switching to 4.2.2.2.1.3.

In 4.2.2.2.1.3, let v be a child node pointed (i.e., v1) by the child certificate identifier of the v; and switch to 4.2.2.2.1.2.

In 4.2.2.2.1.4, check whether a child certificate identifier of the $V_{rc2}$ is NULL; if the child certificate identifier of the $V_{rc2}$ is NULL, the $V_{rc2}$ is a leaf node, switch to 4.2.2.2.2 to execute a specific cancelling operation; and if the child certificate identifier of the $V_{rc2}$ is not NULL, switch to 4.2.2.2.1.5.

In 4.2.2.2.1.5, at the moment, the $V_{rc2}$ is not a leaf node, and the node $V_{rc2}$ is capable of being revoked only after the certificate holder revokes a resource subtree under the node $V_{rc2}$, executing 4.2.2.2.1.6.

In 4.2.2.2.1.6, let $V_{rc2}$ be a child node pointed by the child certificate identifier of the $V_{rc2}$; then, switch to 4.2.2.2.1.4.

In 4.2.2.2.2, the resource transaction module of the resource issuer constructs an RC2 revocation message rc_revoke_request based on the UDP, wherein contents of the rc_revoke_request include a certificate identifier to be revoked (an identifier of the RC2 at the moment), a random number r, and an address of the certificate holder (i.e., the resource receiver); and the resource transaction module of the resource issuer sends the rc_revoke_request to the holder of the resource receiver (the holder of the RC2 here); and the resource issuer initializes a second number of resending times m2 to be 0, and starts a revocation request sending timer corresponding to the RC2.

In 4.2.2.2.3, the resource issuer of the RC2 checks whether the revocation request sending timer is overtime, and if the revocation request sending timer is not overtime; then, switch to 4.2.2.2.4; if the revocation request sending timer is overtime, and m2 is less than the maximum number of resending times M, m2 is increased by 1, the rc_revoke_request is resent to the resource transaction module of the resource receiver, the resource issuer starts the issuance request sending timer corresponding to the RC2; then, switch to 4.2.2.2.4; if m2 is equal to M, the revocation request is failed, the resource transaction module of the resource issuer sends "operation failure" and an operation failure cause (the cause is that the revocation request message sending is overtime) to the display module, the display module displays the "operation failure" and the operation failure cause; then, switch to step 5.

In 4.2.2.2.4, a resource transaction module of the resource issuer of the RC2 determines whether a revocation request reply message rc_revoke_reply sent from the resource transaction module of the resource receiver is received, wherein the rc_revoke_reply includes the message (rc_revoke_request) received by the resource receiver, whether the operation of the resource issuer is agreed, and a random number. If the rc_revoke_reply is not received, the resource transaction module of the resource issuer sends a failure message and an operation failure cause (the cause is that the revocation request reply message sent from the resource receiver is not received) to the display module; then, switch to step 5; if the rc_revoke_reply is received, a format and a content of the rc_revoke_reply are checked, if the format is wrong, the message is discarded, the resource transaction module sends a failure message and an operation failure cause (the cause is that the format of the revocation request reply message sent from the resource receiver is wrong) to the display module; then, switch to step 5; if the format is correct, a reply message in the rc_revoke_reply is checked, if the reply message is to reject the revocation operation, the resource transaction module sends "operation failure" and an operation failure cause (the cause is that the certificate holder disagrees to revoke the certificate) to the display module, the display module displays the "operation failure" and the operation failure cause; then, switch to step 5; and if the reply message is to agree the revocation operation request, switch to 4.2.2.3.

In 4.2.2.3, the resource transaction module of the resource issuer of the RC2 checks whether the node (setting as v1) where the RC2 is located is a leaf node in the resource tree according to an identifier of the RC2 (i.e., determining whether the value of the child certificate identifier domain of the v1 is NULL), and if the v1 is a leaf node (i.e., the value of the child certificate identifier domain of the v1 is NULL), switch to 4.2.2.4; if the v1 is not a leaf node, indicating that the holder of the RC2 does not delete the resource subtree of the RC2 completely, and the RC2 being not in conformity with a revoking condition, "operation failure" and an operation failure cause (the cause is that the holder of the RC2 returns an RC revocation consent request without completely revoking child resources, breaching an agreement or suffering an attack) are sent to the display module; then, switch to step 5.

In 4.2.2.4, the resource transaction module of the resource issuer of the RC2 constructs an RC2 transaction revoking message rc_revoke according to the resource transaction structure, wherein the rc_revoke includes the resource issuer (the issuer of the RC2), the transaction receiver (the holder of the RC2), the transaction type (the RC revocation), the transaction content (the specific content of the RC2), the transaction attribute (NULL), the transaction evidence (the rc_revoke_reply message), a random number+1 issued by the holder of the RC2, and a signature of the resource issuer of the RC2 on the transaction; and the resource transaction module of the resource issuer sends the rc_revoke to the resource transaction module of the resource receiver through the blockchain network.

In 4.2.2.5, if the resource transaction module of the resource receiver receives the rc_revoke sent from the resource transaction module of the resource issuer, the resource transaction module of the resource receiver executes a delete operation according to the transaction type (RC revocation) and the transaction content to delete the resource certificate RC2, and meanwhile, modifies the resource tree, deletes the node v1 where the RC2 is located, and deletes a child certificate identifier pointing to the node v1 in a child certificate identifier domain of a father node of the v1. The transaction is successful at the moment. The resource transaction module of the resource receiver records the transaction in the distributed ledger, and the resource transaction module of the resource receiver sends a transaction success message to the resource transaction module of the resource issuer; then, switch to 4.2.2.6; otherwise, the resource transaction module of the resource issuer sends a transaction failure message; then, switch to 4.2.2.7.

In 4.2.2.6, if the resource transaction module of the resource issuer of the RC2 receives the transaction success message sent from the resource transaction module of the resource receiver, "transaction success" is sent to the display module, the display module displays the "transaction success"; then, switch to step 5.

In 4.2.2.7, if the resource issuer receives the transaction failure message, "operation failure" is sent to the display module and an operation failure cause (the cause is that the resource is failed to delete) is prompted, the display module displays the "operation failure" and the operation failure cause; switch to step 5.

In 4.2.3, at the moment, the resource transaction module of the resource transaction application client receives an RC3 overwriting message such as expiration time modifying and certificate serial number of RC (setting as RC3) not related to public and private keys and resource allocation from the resource issuer, and overwrites the certificate RC3 according to the certificate overwriting method in 4.2.3.1 to 4.2.3.6.

In 4.2.3.1, a resource transaction module of a resource issuer of the RC3 sets an RC3 overwriting instruction, wherein contents of the RC3 overwriting instruction include the currently effective RC3, a holder of the resource certificate RC3, an RC3 identifier, and an attribute value capable of being modified by an overwriting operation (including a certificate expiration time and an integer serial number); if the attribute value to be overwritten does not meet a value range (for example, the expiration time of the RC3 is earlier than the existing expiration time value of the RC3), sends an error message to the display module, and resets the attribute value to be overwritten; then, switch to 4.2.3.2.

In 4.2.3.2, the resource issuer of the RC3 and a resource holder of the certificate RC3 (serving as the resource receiver) execute bidirectional authorization, specifically including the following steps.

In 4.2.3.2.1, the resource transaction module of the resource issuer of the RC3 constructs an RC3 overwriting request message rc_overwrite1_request based on a UDP, wherein contents of the rc_overwrite1_request include a certificate identifier to be overwritten, a random number r, and an ID of the certificate holder; and the resource transaction module of the resource issuer sends the RC3 overwriting request message rc_overwrite1_request to a certificate holder through the blockchain network. The resource transaction module of the resource issuer initializes a third number of resending times m3 to be 0, and starts an overwriting request sending timer corresponding to the RC3.

In 4.2.3.2.2, the resource transaction module of the resource issuer of the RC3 checks whether the overwriting request sending timer of the RC3 is overtime, and if the overwriting request sending timer is not overtime, switch to 4.2.3.2.3; if the overwriting request sending timer of the RC3 is overtime, and m3 is less than the maximum number of resending times M, m3 is increased by 1, the resource transaction module of the resource issuer resends the rc_overwrite1_request of the RC3, and starts the overwriting request sending timer of the RC3; then, switch to 4.2.3.2.2. If the overwriting request sending timer of the RC3 is overtime and m3 is equal to M, the overwriting request of the RC3 is failed, "operation failure" and an operation failure cause (the cause is that the overwriting request messaging is failed to send) are sent to the display module, and the display module displays the "operation failure" and the operation failure cause; then, switch to step 5.

In 4.2.3.2.3, the resource transaction module of the resource issuer of the RC3 determines whether an overwriting request reply message rc_overwrite1_reply of the RC3 sent from the resource transaction module of the certificate holder is received, wherein contents of the rc_overwrite1_reply include the message (rc_overwriter1_request) received by the resource receiver, whether an operation of the resource issuer is agreed, and a random number; if the rc_overwrite1_reply is not received, the resource transaction module of the resource issuer sends "operation failure" and an operation failure cause (the cause is that the overwriting request reply message sent from the resource transaction module of the resource receiver is not received) to the display module; then, switch to step 5; if the rc_overwrite1_reply is received, a format and a content of the rc_overwrite1_reply are checked, if the format is wrong, the message is discarded, and the resource transaction module of the resource issuer sends "operation failure" and an operation failure cause (the cause is that the format of the overwriting request reply message is wrong) to the display module; then, switch to step 5; if the format is correct, the rc_overwrite1_reply is checked, if the rc_overwrite1_reply is to reject the overwriting operation request, "operation failure" and an operation failure cause (the cause is that the certificate holder, i.e., the resource receiver, disagrees the operation) to the display module, and the display module displays the "operation failure" and the operation failure cause; then, switch to step 5; and if the reply message in the rc_overwrite1_reply is to agree the operation request, then execute 4.2.3.3.

In 4.2.3.3, the resource transaction module of the resource issuer of the RC3 constructs an RC3 overwriting message rc_overwrite1 according to the resource transaction structure, wherein the rc_overwrite1 includes the resource issuer (the issuer of the RC3 at the moment), the resource receiver (the holder of the RC3 at the moment), the transaction type, (the RC3 overwriting at the moment), the transaction content, (content of new RC3' at the moment, i.e., overwritten content of the certificate RC3 to be overwritten), the transaction attributes (including the transfer attribute and the expired attribute), the transaction evidence (rc_overwrite1_reply message, and a random number+1 issued by the holder of the RC3 at the moment), and a signature of the resource issuer of the RC3 on the transaction; and the resource transaction module of the resource issuer of the RC3 sends the rc_overwrite1 to the resource transaction module of the resource receiver through the blockchain network.

In 4.2.3.4, if the resource transaction module of the resource receiver receives the rc_overwrite1 sent from the resource transaction module of the resource issuer, the resource transaction module of the resource receiver replaces the RC3 to be overwritten with RC3' according to the transaction type (overwriting) and the transaction content, the transaction is successful at the moment; and the resource transaction module of the resource receiver modifies the resource tree: modifying information of a resource certificate domain of a node where the resource certificate RC3 is located, i.e., replacing the resource certificate domain (information of the RC3 before modification) with information of the RC3', and recording, by the resource transaction module of the resource receiver, the transaction in the distributed ledger; meanwhile, sending, by the resource transaction module of the resource receiver, a transaction success message to the resource transaction module of the resource issuer, and switching to 4.2.3.5; otherwise, sending a transaction failure message to the resource transaction module of the resource issuer, and switching to 4.2.3.6.

In 4.2.3.5, if the resource transaction module of the resource issuer of the RC3 receives the transaction success message sent from the resource transaction module of the resource receiver, and sends "transaction success" to the display module, the display module displays the "transaction success"; then, switch to step 5.

In 4.2.3.6, if the resource issuer of the RC3 receives the transaction failure message, "operation failure" and an operation failure cause (the cause is that the resource receiver fails to overwrite the certificate) are sent to the display module, and the display module displays the "operation failure" and the operation failure cause; then, switch to step 5.

In 4.2.4, at the moment, the resource transaction module of the resource transaction application client receives the message of modifying the RC (setting as RC4) related to resource allocation adjustment from the resource issuer, the resource transaction module of the resource issuer needs to revoke the old certificate RC4, and then sets and issues a new certificate (setting as RC5) according to the message of modifying via a method including the following steps.

In 4.2.4.1, the RC4 is revoked according to the certificate revoking method in 4.2.2.

In 4.2.4.2, an instruction of issuing the new certificate (setting as RC5) is set according to the message of modifying, and the RC5 is issued according to the certificate issuing method in 4.2.1; then, switch to step 5.

In 4.2.5, at the moment, the resource transaction module of the resource transaction client receives the message issued by the ROA (setting as ROA1) from the resource issuer, and issues the ROA1 according to the ROA issuing method in 4.2.5.1 to 4.2.5.7.

In 4.2.5.1, a resource transaction module of a resource issuer of the ROA1 sets an ROA issuing instruction, wherein contents of the ROA1 issuing instruction include the pre-issued IP address prefix and AS number.

In 4.2.5.2, the resource transaction module of the resource issuer of the ROA1 checks whether the IP address prefix and the AS number contained in the ROA1 are possessed by the resource issuer of the ROA according to an IP address prefix and an AS number in the ROA1 issuing instruction, i.e., checks whether the IP address prefix and the AS number contained in the pre-issued ROA pre-issued are contained in an IP address prefix and an AS number bound to the resource certificate possessed by the resource issuer of the ROA1; if not contained, then a conflict occurs; then, switch to 4.2.5.2.2; and if contained, then no conflict occurs; then, switch to 4.2.5.2.1.

In 4.2.5.2.1, the resource transaction module of the resource issuer of the ROA1 checks whether the pre-issued IP address prefix and AS number resource are already issued, queries the ROA transaction record of the resource issuer of the ROA1 recorded in the distributed ledger, obtains all the ROAs already issued by the resource issuer of the ROA1, and checks whether the IP address prefixes and the AS numbers contained in all the issued ROAs are overlapped with the pre-issued IP address prefix and AS number by comparison; if overlapped, then a conflict occurs (indicating that the IP address prefix and the AS number resource are already issued), switch to 4.2.5.2.3; and if no conflict occurs, switch to 4.2.5.3.

In 4.2.5.2.2, the resource transaction module of the resource issuer of the ROA1 sends an "operation failure" message and a cause that (the cause is that a resource conflict occurs, and the IP address prefix and the AS number held by the resource issuer do not include the IP address prefix and the AS number contained in the pre-issued ROA) to the display module, and the display module displays the "operation failure" message that includes the operation failure cause; then, switch to step 5.

In 4.2.5.2.3, the resource transaction module of the resource issuer of the ROA1 sends an "operation failure" message and a cause (the cause is that the IP address prefix and the AS number contained in the pre-issued ROA are already issued) to the display module, and the display module displays the "operation failure" message that includes the operation failure cause; then, switch to 4.2.5.2.4.

In 4.2.5.2.4, the resource transaction module of the resource issuer of the ROA1 checks whether the instruction of "abandoning the transaction" is received from the resource issuer, if received, switch to step 5; otherwise, switch to 4.2.5.2.5.

In 4.2.5.2.5, the resource transaction module of the resource issuer of the ROA1 determines whether a revocation message (revoking the already issued ROA conflicting with the ROA1) is received from the resource issuer; if the revocation message is received, then the already issued ROA conflicting with the pre-issued ROA1 is revoked; then, switch to 4.2.5.2; and if the revocation message is not received, switch to step 5.

In 4.2.5.3, a checking result is that no conflict occurs, the resource transaction module of the resource issuer of the ROA1 sends the IP address prefix and the AS number in the ROA1 issuing instruction to the resource certificate generating module of the resource issuer; and the resource certificate generating module of the resource issuer generates the ROA1 according to contents (IP address prefix and AS number) of the ROA issuing instruction.

In 4.2.5.4, the resource transaction module of the resource issuer of the ROA1 constructs an ROA1 issuance transaction message (roa_issue) according to the defined resource transaction structure, wherein the roa_issue includes the resource issuer (the issuer of the ROA1 at the moment), the resource receiver (the receiver of the ROA1 at the moment), the transaction type, (the ROA1 issuance at the moment), the transaction content, (the specific content of the ROA1 at the moment), the transaction attributes (including the transfer attribute and the expired attribute, wherein when the transfer attribute is NULL, the expired attribute indicates whether the ROA has a time limit), and the transaction evidence (NULL at the moment), and a signature of the resource issuer of the ROA1 on the transaction; and the resource transaction module of the resource issuer of the ROA1 sends the ROA1 issuance transaction message roa_issue to the resource receiver through the blockchain network.

In 4.2.5.5, if the resource transaction module of the resource receiver receives the roa_issue sent from the resource transaction module of the resource issuer of the ROA1, the message is parsed to obtain the transaction type (ROA1 issuance) and the transaction content (the specific content of the ROA1); the transaction is successful at the moment, the resource transaction module of the resource receiver records the transaction in the distributed ledger, and the resource transaction module of the resource receiver sends a transaction success message to the resource transaction module of the resource issuer; then, switch to 4.2.5.6; if the transaction is unsuccessful, the resource transaction module of the resource receiver sends a transaction failure message to the resource transaction module of the resource issuer; then, switch to 4.2.5.7.

In 4.2.5.6, if the resource issuer of the ROA1 receives the transaction success message from the resource receiver, "transaction success" is sent to the display module, and the display module displays the "transaction success"; then, switch to step 5.

In 4.2.5.7, if the resource issuer of the ROA1 receives the transaction failure message from the resource receiver, the resource transaction module of the resource issuer of the ROA1 deletes the ROA1, and sends an operation failure message and an operation failure cause that (the cause is that the resource receiver fails to acquire the transaction content) to the display module, and the display module displays the "operation failure" and the operation failure cause; then, switch to step 5.

In 4.2.6, at the moment, the resource transaction module of the resource transaction client receives an ROA (setting as ROA2) revocation message from the resource issuer, and revokes the ROA2 according to the ROA revoking method in 4.2.6.1 to 4.2.6.5.

In 4.2.6.1, a resource transaction module of the resource transaction application client of a resource issuer of the ROA2 sets an ROA2 revoking instruction, wherein the ROA2 revoking instruction includes a holder of the ROA2 and an identifier of the ROA2, and sends a specific content of the ROA2 to the display module, and the display module displays the specific content of the ROA2.

In 4.2.6.2, the resource transaction module of the resource issuer of the ROA2 constructs an ROA2 revocation transaction message roa_revoke according to the defined resource transaction structure, wherein contents of the roa_revoke include the resource issuer (the issuer of the ROA2 at the moment), the resource receiver (the holder of the ROA2 at the moment), the transaction type, (the ROA2 revocation at the moment), the transaction content, (the identifier of the ROA2 at the moment), the transaction attributes (NULL at the moment), and the transaction evidence (NULL at the moment), and a signature of the resource issuer of the ROA2 on the transaction; and the resource transaction module of the resource issuer sends the roa_revoke to the resource transaction module of the resource receiver through the blockchain network.

In 4.2.6.3, if the resource transaction module of the resource receiver receives the roa_revoke sent from the resource transaction module of the resource issuer, the message is parsed to obtain the transaction type (the ROA2 revocation at the moment) and the transaction content (the specific content of the ROA2), and the resource transaction module of the resource receiver deletes the ROA2, the transaction is successful at the moment, and the resource transaction module of the resource receiver sends a transaction success message to the resource transaction module of the resource issuer; then, switch to 4.2.6.4; if the transaction is unsuccessful, the resource transaction module of the resource receiver sends a transaction failure message to the resource transaction module of the resource issuer; then, switch to 4.2.6.5.

In 4.2.6.4, if the resource transaction module of the resource issuer receives the transaction success message sent from the resource receiver, the resource transaction module of the resource receiver deletes the ROA2, records the transaction in the distributed ledger, sends "transaction success" to the display module, and the display module displays the "transaction success"; then, switch to step 5.

In 4.2.6.5, if the resource transaction module of the resource issuer receives the transaction failure message, an operation failure notification and an operation failure cause (the cause is that the resource receiver fails to delete the ROA2) are sent to the display module, and the display module displays the "operation failure" and the operation failure cause; then, switch to step 5.

In 4.2.7, at the moment, the resource transaction module of the resource transaction application client receives an ROA (setting as ROA3) modifying instruction from the resource issuer, then a resource transaction module of a resource issuer of the ROA3 needs to revoke the ROA3 first, and then generates a new ROA3' according to the modified content, and issues a new certificate ROA3' via a method including the following steps.

In 4.2.7.1, the ROA3 is revoked according to the ROA revoking method in 4.2.6.

In 4.2.7.2, the new ROA3' is generated according to the modified content, the ROA3' is issued according to the ROA issuing method in 4.3.5; then, switch to step 5.

In step 5, switch to 4.2. The resource transaction module of the resource transaction application client waits to receive next message from the resource issuer to carry out next transaction.

Note: when the revocation message (revoking the resource certificate conflicting with the pre-issued RC1) is received in 4.2.1.2.3, the revocation method used to revoke the issued RC conflicting with the pre-issued RC1 is the same as that described in 4.2.2. When the ROA1 revocation message (revoking the already issued ROA conflicting with the ROA1) is received in 4.2.5.2.5, the method used to revoke the already issued ROA conflicting with the pre-issued ROA1 is the same as that described in 4.2.6.

The disclosure can achieve the following technical effects:

1. The disclosure can overcome the malicious operations of the malicious resource issuers on various resource certificates RCs faced by the current RPKI, and the addition of the bidirectional authorization makes the resource issuer need the consent of the resource receiver for various operations on the resource certificate, thus effectively avoiding the security threat that some legal IP addresses are blocked or redirected to different forwarding paths at the routing forwarding level.

2. The disclosure relates to the method for the bidirectional authorization of the RPKI built on the blockchain, which effectively improves the security of the RPKI. With the addition of the bidirectional authorization, the resource issuer needs the consent of the resource receiver for any operation (issuance, revocation, modification, and overwriting) of resources, which effectively limits the rights of the resource issuer, and can effectively prevent the security threat of some illegal routes caused by the malicious operations of the malicious authorities on various resource certificates under the current RPKI architecture.

3. The disclosure uses the blockchain to save the transactions, and the data in all the distributed ledgers in the blockchain are the same and cannot be tampered, so different users read the resource certificate data from the ledgers and see the same data when querying the transaction records, so the disclosure can effectively prevent mirror attack risks existing in the current RPKI. Mirror attack means that the malicious authority manipulates different resource certificate views to different users, so as to achieve the purpose of illegally attracting traffic by blocking some legal IP addresses or redirecting the legal IP addresses to different forwarding paths at the route forwarding level.

4. The blockchain technology is employed in the disclosure, due to fault tolerance of the blockchain network, errors of some nodes will not cause errors of the whole blockchain network, so that the RPKIB constructed in step 1 also has certain fault tolerance.

DETAILED DESCRIPTION

Figure 4:
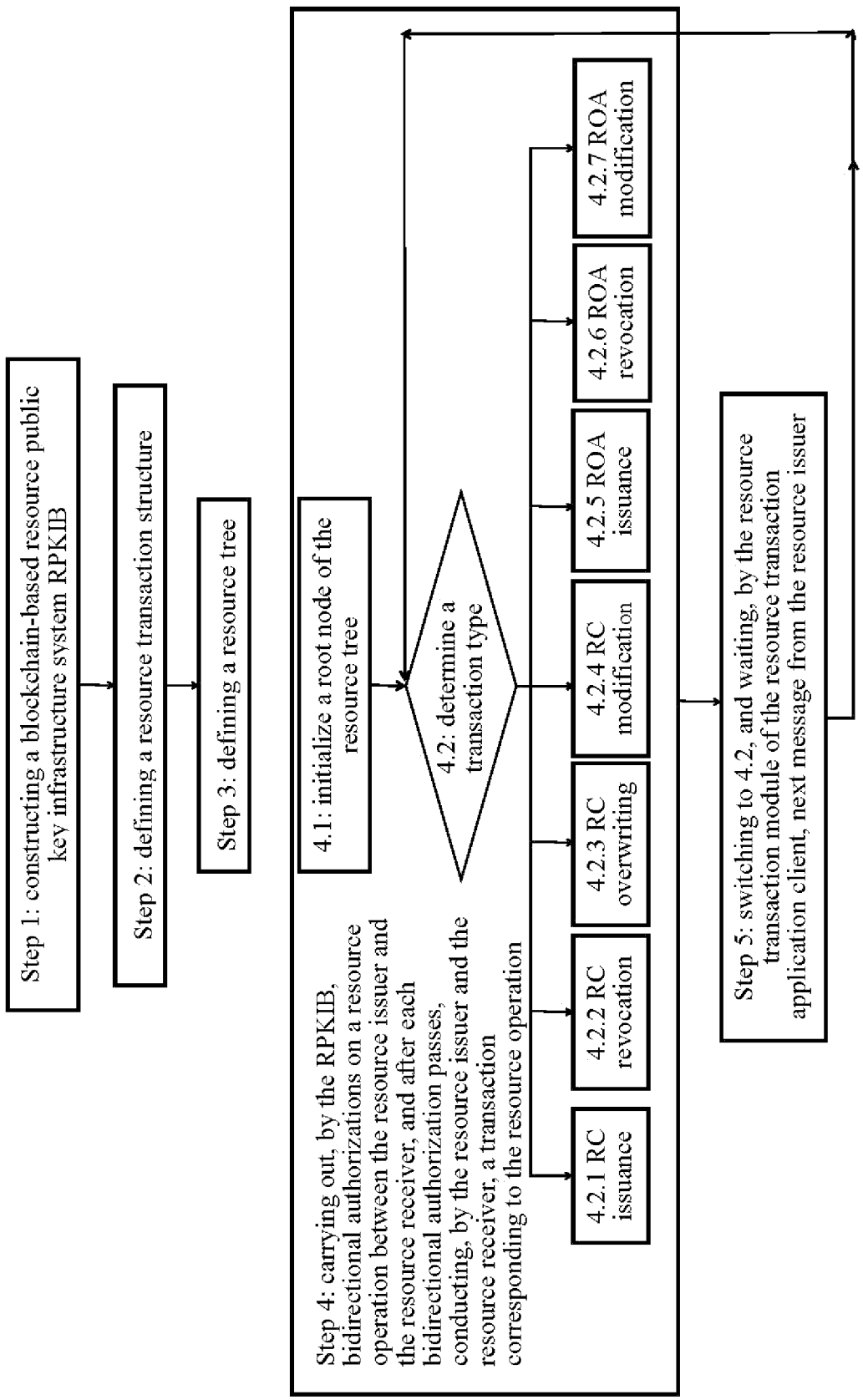
FIG. 4 is an overall flow chart of the disclosure.

As shown in FIG. 4, the disclosure includes the following steps.

Figure 1:
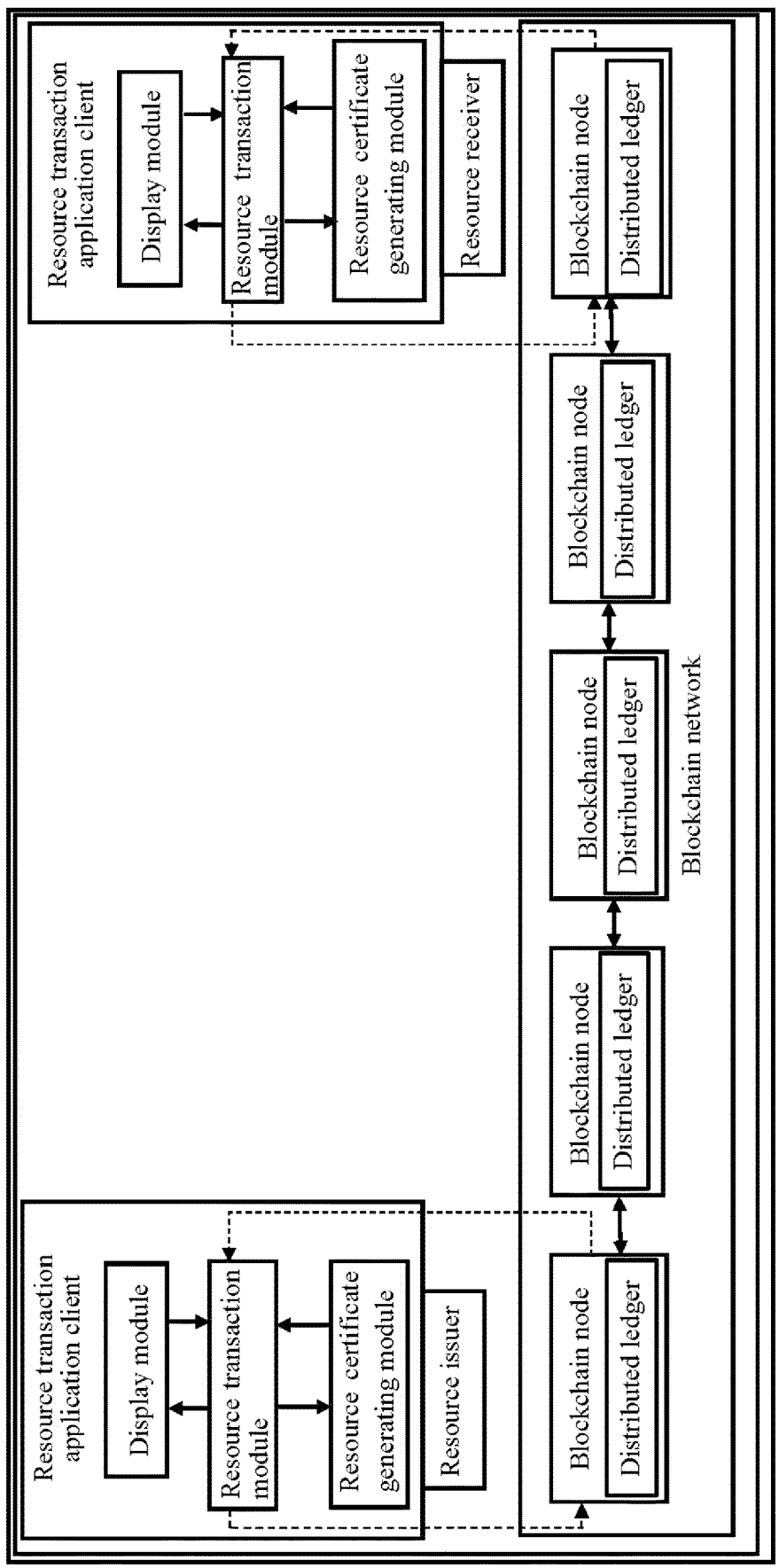
FIG. 1 is an overall structure diagram of a bidirectional authorization system RPKIB based on a blockchain-based resource public key infrastructure constructed in step 1 according to the disclosure.

In step 1, a blockchain-based resource public key infrastructure system RPKIB is constructed. As shown in FIG. 1, the RPKIB is composed of a resource issuer, a resource transaction application client, a resource receiver and a blockchain network.

The blockchain network is connected with the resource issuer, the resource receiver and the resource transaction application client. The resource issuer and the resource receiver serve as a node of the blockchain network, and the resource transaction application client is installed on the node where the resource issuer and the resource receiver are located. The resource transaction application client takes various operations of the resource certificate and the route origin authorization ROA as transactions that are carried out through the blockchain network, and saves transaction records in a distributed ledger. The distributed ledger exists in all blockchain nodes.

The resource receiver is a server with the resource transaction application client installed thereon, and is connected with the blockchain network. The resource issuer is connected to the blockchain network, and becomes a node of the blockchain network. The resource issuer and the resource receiver serve as both parties of a transaction; after obtaining the consent of both parties through bidirectional authorization, the both parties of the transaction conduct transactions through the blockchain network and record the transactions in the distributed ledger.

The resource receiver is a server with the resource transaction application client installed thereon, and is connected with the blockchain. The resource receiver is connected to the blockchain network, and becomes a node of the blockchain network.

The resource transaction application client is installed on the resource issuer and the resource receiver, and is composed of a resource transaction module, a resource certificate generating module and a display module.

The resource certificate generating module is connected with the resource transaction module; the resource certificate generating module receives pre-issued RC certificate and ROA information from the resource transaction module, and generates a resource certificate RC with the same definition as that of the RPKI according to the pre-issued RC certificate. Contents of the resource certificate RC include an X.509 certificate of standard RFC 5280, as well as an IP address and an AS extended identifier of standard RFC 3779. The resource certificate generating module creates route origin authorization ROA for a resource held by the resource receiver according to the pre-issued ROA information (including one AS number and one or more IP address prefixes) . The resource certificate generating module sends the RC and the ROA generated to the resource transaction module.

The resource transaction module is connected with the resource issuer (or the resource receiver), the resource certificate generating module, the display module and the blockchain network. the resource transaction module receives the RC or the ROA from the resource certificate generating module, receives an operation instruction regarding the RC or the ROA from the resource issuer, conducts a transaction through the blockchain network, and provides various operation services of RC or ROA resource transactions for the resource issuer, and one operation is one transaction in the RPKIB. The resource transaction module sends a transaction success message to the display module when the transaction is successful. The resource transaction module sends a conflict cause and an operation failure cause obtained by conflict detection, and a transaction result to the display module when the transaction is unsuccessful, and sends the RC and the ROA to the display module when revoking the operation.

The display module is connected with the resource transaction module, which receives the transaction success message or the conflict reason, the operation failure reason and the transaction result when the transaction is unsuccessful, from the resource transaction module, and displays the same; and receives the RC and the ROA from the resource transaction module when revoking the operation, and display specific contents of the RC and the ROA.

In step 2, a resource transaction structure is defined.

Figure 2:
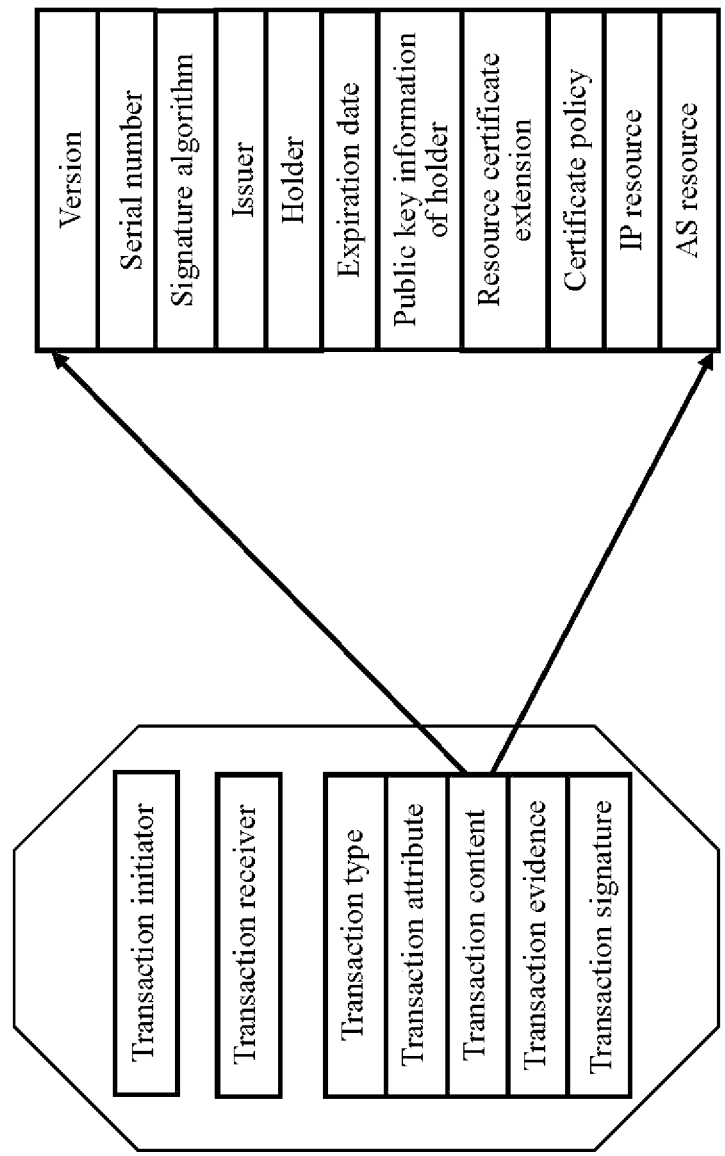
FIG. 2 is a structural drawing of a resource transaction structure according to step 2 of the disclosure.

As shown in FIG. 2, the resource transaction structure includes a transaction initiator, a transaction receiver, a transaction type, a transaction content, a transaction attribute, a transaction evidence, and a transaction signature given by the transaction initiator. The transaction initiator refers to an address of the resource issuer, and the transaction receiver is an address of the resource receiver. The transaction signature refers to a digital signature for a transaction initiated by the transaction initiator in the blockchain network. Seven transaction types are provided, which are respectively: RC issuance, RC revocation, RC $_{overwriting}$, RC modification, route origin authorization ROA issuance, ROA revocation and ROA modification. The transaction content is a content of the RC or the ROA corresponding to the transaction. The transaction attribute includes a transfer attribute and an expired attribute; the transfer attribute represents whether an IP address resource allocated to an institution is capable of being reallocated to another resource authorization entity, the transfer attribute being 0 indicates that the resource issuer does not want to sub-allocate an IP address prefix resource which is allocated to an institution, and the institution at the moment is called a terminal node, the IP address resource and an AS number resource possessed thereof are incapable of being reallocated, and only the terminal node is able to issue the ROA; the transfer attribute being 1 indicates that the resource issuer wants to sub-allocate an IP address prefix resource which is allocated to an institution; the expired attribute shows whether the IP address resource has a lease term, the expired attribute being 0 indicates that the lease term is not expired, while the expired attribute being 1 indicates that the lease term is expired, and the IP address resource needs to be released and returned to an original resource authorization entity. The transaction evidence indicates that the resource issuer and the resource receiver sign twice, and an evidence agreed by both parties consists of a message and a random number of transactions of both parties. The transaction signature given by the transaction initiator shows that the transaction initiator and the transaction receiver reach an agreement on the transaction. A field of a transaction signature given by a transaction initiator of an ROA related operation is NULL.

Figure 3:
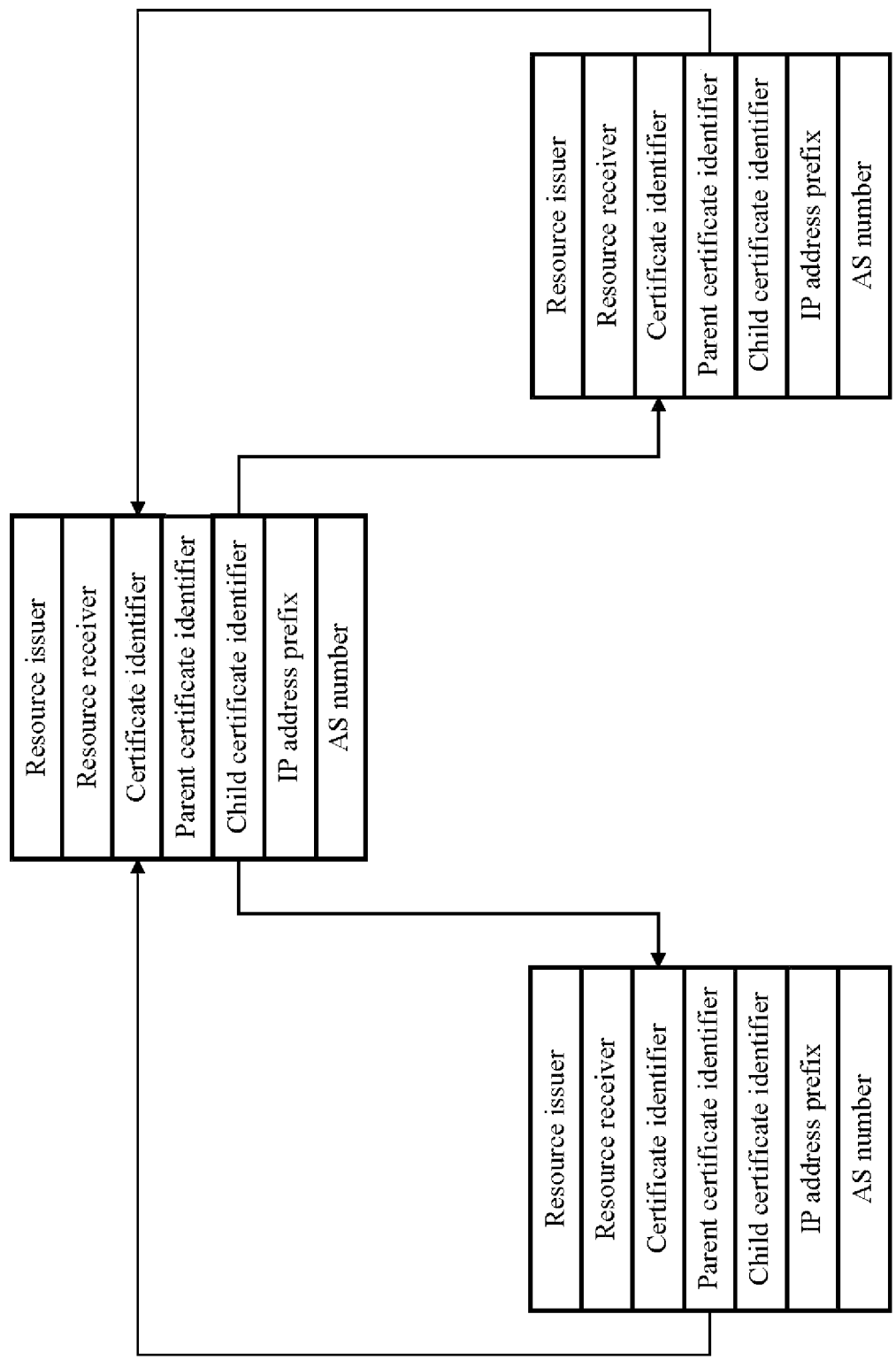
FIG. 3 is a structural drawing of a resource tree according to step 3 of the disclosure.

In step 3, a resource tree is defined. As shown in FIG. 3, the resource tree is constructed by the resource transaction module according to a valid resource certificate. One node of the resource tree includes seven domains, which are respectively: the resource issuer, the resource receiver, the resource certificate, a parent certificate identifier, a child certificate identifier, an IP address prefix contained in the certificate and an AS number contained in the certificate. The node is linked to a child node through the child certificate identifier domain, and is linked to a parent node of the node through the parent certificate identifier domain.

The IP address prefix contained in the certificate and the AS number contained in the certificate are both obtained by the resource transaction module through parsing the certificate. The resource tree is saved in the distributed ledger, and is jointly maintained by the resource issuer and the resource receiver.

In step 4, the blockchain-based resource public key infrastructure system RPKIB carries out bidirectional authorization on a resource operation between the resource issuer and the resource receiver, and after each bidirectional authorization passes, the resource issuer and the resource receiver conduct a transaction corresponding to the resource operation via a method including the following steps.

In 4.1, the resource transaction module initializes a root node of the resource tree, and lets the root node be $V_0$, uses a Regional Internet registry RIR as a first block of the blockchain, and uses a resource certificate possessed by the RIR as the root node $V_0$ of the resource tree, wherein a resource issuer and a resource receiver of the $V_0$ are both IP addresses of the RIR, a resource certificate of the $V_0$ is the resource certificate held by the RIR, a parent certificate identifier of the $V_0$ is NULL, a child certificate identifier of the $V_0$ is NULL (because the RIR does not issue a child certificate), an IP address prefix of the $V_0$ is an IP address prefix possessed by the RIR, and an AS number is an AS number possessed by the RIR; and records the $V_0$ in the distributed ledger.

In 4.2, the resource transaction module of the resource transaction application client receives a message from the resource issuer, and if a message of issuing a resource certificate RC (setting as RC1) is received, switch to 4.2.1; if a message of revoking a resource certificate RC (setting as RC2) is received, switch to 4.2.2; if a message of overwriting a resource certificate RC (setting as RC3) is received, switch to 4.2.3; if a message of modifying an RC (setting as RC4) related to resource allocation adjustment is received, switch to 4.2.4; if a message of issuing an ROA (setting as ROA1) is received, switch to 4.2.5; if a message of revoking an ROA (setting as ROA2) is received, switch to 4.2.6; and if a message of modifying an ROA (setting as ROA3) is received, switch to 4.2.7.

In 4.2.1, at the moment, the resource transaction module receives the message of issuing the RC1 from the resource issuer, the message of issuing the RC1 containing an IP address of the resource receiver (setting as $IP_{receiver\ 1}$), as well as an IP address prefix (setting as $IP_{prefix\ 1}$) and an AS number (setting as AS1) pre-issued to the resource receiver, and issues the certificate RC1 according to the certificate issuing method in 4.2.1.1 to 4.2.1.10.

In 4.2.1.1, the resource transaction module sets an RC1 issuing instruction, the RC1 issuing instruction including the $IP_{receiver\ 1}$, the $IP_{prefix\ 1}$ and the AS1.

In 4.2.1.2, the resource transaction module carries out the following operations according to contents of the RC issuing instruction.

In 4.2.1.2.1, the resource transaction module searches the resource tree according to the $IP_{prefix\ 1}$ and the AS1 in the RC1 issuing instruction, and checks whether the pre-issued certificate RC1 conflicts with the certificate RC already issued in the resource tree via a method including the following steps.

In 4.2.1.2.1.1, whether the pre-issued $IP_{prefix\ 1}$ and AS1 are possessed by the resource issuer (setting an IP address thereof as $IP_{issuer\ 1}$) is checked via a method including the following steps.

In 4.2.1.2.1.1.1, the resource transaction module of the resource issuer parses the self-held resource certificate $RC_{issuer}$, and obtains the IP address prefix and the AS number contained in the $RC_{issuer}$.

In 4.2.1.2.1.1.2, the resource transaction module of the resource issuer checks whether the pre-issued $IP_{prefix\ 1}$ and AS1 are contained in the IP address prefix and the AS number contained in the $RC_{issuer}$, if the pre-issued $IP_{prefix\ 1}$ and AS1 are contained in the IP address prefix and the AS number contained in the $RC_{issuer}$, the pre-issued $IP_{prefix\ 1}$ and AS1 is possessed by the resource issuer, and no conflict occurs, switch to 4.2.1.2.1.2; and if the pre-issued $IP_{prefix\ 1}$ and AS1 are not contained in the $RC_{issuer}$, the pre-issued $IP_{prefix\ 1}$ and AS1 is possessed by the resource issuer, and a conflict occurs, switch to 4.2.1.2.1.3;

in 4.2.1.2.1.2, whether the $IP_{prefix\ 1}$ and the AS1 contained in the pre-issued certificate RC1 are already issued is checked, i.e., whether the IP address prefix and the AS number contained in the resource certificate already issued by the resource issuer include the $IP_{prefix\ 1}$ and the AS1 is checked, if a checking result is "not issued", switch to 4.2.1.3; and if a checking result is that "the pre-issued $IP_{prefix\ 1}$ and AS1 are already issued, resulting in a conflict", switch to 4.2.1.2.1.4, wherein a specific method includes the following steps.

In 4.2.1.2.1.2.1, let the node variable $v=V_0$.

In 4.2.1.2.1.2.2, the value in the child certificate identifier domain of the v is checked; if the value is NULL, the checking result is "not issued"; then, switch to 4.2.1.3; if the value is not NULL, a node where the resource issuer is located is found via a method including: obtaining the child node v1 by the value in the child certificate identifier domain of the v, determining whether the value of the resource certificate domain of the v1 is just the RC1 held by the resource issuer; if the values are equal, the node v1 is the node where the resource issuer is located, switch to 4.2.1.2.1.2.4; if the values are not equal, switch to 4.2.1.2.1.2.3.

In 4.2.1.2.1.2.3, let v=v1, and switch to 4.2.1.2.1.2.2.

In 4.2.1.2.1.2.4, a child node v2 of the v1 is obtained through the child certificate identifier domain of the node v1, the resource transaction module of the resource issuer parses a resource certificate RCv2 held by the child node v2, whether an IP address prefix and an AS number contained in the RCv2 are overlapped with the pre-issued $IP_{prefix\ 1}$ and AS1 are checked by comparison; if overlapped, indicating that the pre-issued $IP_{prefix\ 1}$ and AS1 are already issued, a conflict occurs, and a checking result is that "the pre-issued $IP_{prefix\ 1}$ and AS1 are already issued, resulting a conflict", switch to 4.2.1.2.1.4; if not overlapped, indicating that the pre-issued $IP_{prefix\ 1}$ and AS1 are not issued, and a checking result is "not issued", switch to 4.2.1.3.

In 4.2.1.2.1.3, the resource transaction module sends a "resource conflict" message to the display module, and the display module displays the "resource conflict" message, wherein the message contains a resource conflict cause (the resource conflict cause is that the IP address prefix resource and the AS number contained in the pre-issued certificate RC are not possessed by a current certificate issuer); then, switch to step 5.

In 4.2.1.2.1.4, the resource transaction module sends a "resource conflict" message to the display module, and the display module displays the "resource conflict" message, wherein the message contains a resource conflict cause (the resource conflict cause is that the IP address prefix and the AS number contained in the pre-issued RC certificate are already issued); then, switch to 4.2.1.2.2.

In 4.2.1.2.2, the resource transaction module checks whether an instruction of "abandoning the transaction" is received from the resource issuer, and if the instruction is received, switch to step 5; otherwise, switch to 4.2.1.2.3.

In 4.2.1.2.3, the resource transaction module determines whether a revocation message (revoking an issued resource conflicting with the pre-issued RC1) is received from the resource issuer, and if the revocation message is received, revokes the issued RC conflicting with the pre-issued RC1; and if the revocation message is not received, switch to step 5.

In 4.2.1.3, the resource transaction module sends the $IP_{prefix\ 1}$ and the AS1 in the RC1 issuing instruction to the resource certificate generating module; then, switch to 4.2.1.4.

In 4.2.1.4, the resource certificate generating module generates a resource certificate according to the $IP_{prefix\ 1}$ and the AS1 received from the resource transaction module, and names the certificate as RC1.

In 4.2.1.5, the resource issuer and the resource receiver of the RC1 carry out bidirectional authorization, wherein the details are as follows.

In 4.2.1.5.1, the resource transaction module of the resource issuer of the RC1 constructs an RC1 issuance request message rc_issue_request based on a UDP, and sends the rc_issue_request to the resource transaction module of the resource receiver through the blockchain network, wherein contents of the rc_issue_request include an issued certificate (RC1 here), a parent certificate identifier (certificate possessed by the resource issuer), a random number r, and the address of the resource receiver. The resource issuer of the RC1 initializes a number of resending times m to be 0, starts an issuance request sending timer corresponding to the RC1, and waits for receiving an RC1 issuance request reply message from the resource receiver.

In 4.2.1.5.2, the resource issuer of the RC1 checks whether the issuance request sending timer is overtime, and if the issuance request sending timer is not overtime, switch to 4.2.1.5.3; if the issuance request sending timer is overtime, and m is less than a maximum number of resending times M (M is a positive integer, and M is less than or equal to 16), m is increased by 1, the rc_issue_request is resent to the resource receiver, the issuance request sending timer corresponding to the RC1 is restarted; and switch to 4.2.1.5.3; if the issuance request sending timer is overtime and m is equal to M, the issuance request is failed, the resource issuer deletes the RC1, and the resource transaction module sends operation failure and an operation failure cause (the cause is overtime sending) to the display module for display; then, switch to step 5; then, switch to step In 4.2.1.5.3, the resource issuer of the RC1 determines whether the issuance request reply message rc_issue_reply is received from the resource receiver, wherein contents of the rc_issue_reply include a received message (rc_issue_request), whether an operation of the resource issuer is agreed, and a random number; if the rc_issue_reply is not received, the resource transaction module of the resource issuer of the RC1 sends a failure message and an operation failure cause (the cause is that the issuance request reply message sent from the resource receiver is not received) to the display module; then, switch to step 5; if the rc_issue_reply is received, a format and a content of the rc_issue_reply is checked, if the format is wrong, the rc_issue_repl is discarded, the resource transaction module sends a failure message and an operation failure cause (the cause is that the format of the issuance request reply message is wrong) to the display module; then, switch to step 5; if the format is correct, the content of the rc_issue_reply message are checked, if the content is to reject the issuance, the resource issuer deletes the RC1, and meanwhile, the resource issuer sends an operation failure message and an operation failure cause (the cause is that the resource receiver disagrees to issue the certificate) to the display module of the resource transaction application client, the display module displays the operation failure message and the operation failure cause; then, switch to step 5; and if the content in the rc_issue_reply is to agree the issuance operation request, execute 4.2.1.6.

In 4.2.1.6, the resource transaction module of the resource issuer constructs an issuance transaction message rc_issue of the RC1 according to the resource transaction structure, wherein contents of the rc_issue_request include the resource issuer (the issuer of the RC), the resource receiver (the receiver of the RC1), the transaction type (the RC1 issuance), the transaction content (the specific content of the RC1), the transaction attributes (including the transfer attribute and the expired attribute), the transaction evidence (the rc_issue_reply message, and a random number+1 issued by the receiver of the RC), and a signature of the resource issuer of the RC1 on the transaction; and the resource issuer sends the rc_issue to the resource receiver through the blockchain network.

In 4.2.1.7, if the resource transaction module of the resource receiver receives the rc_issue sent from the resource issuer and obtains a specific transaction content, i.e., the resource certificate RC1, from a transaction content domain of the rc_issue, the transaction is successful. The resource transaction module of the resource receiver records the transaction into the distributed ledger, and the resource transaction module of the resource receiver creates a new node (named as an RC1 node), for the resource tree via a method including the following steps.

In 4.2.1.7.1, information of a parent node of the RC1 node, i.e., the node where the certificate $RC_{issuer}$ held by the resource issuer is located is overwritten, and a child certificate identifier is added to the child certificate identifier domain, wherein the child certificate identifier points to the new node RC1.

In 4.2.1.7.2, the new node RC1 is created and information of each domain is filled in: a resource issuer domain of the RC1 node is the IP address $IP_{issuer\ 1}$ of the resource issuer of the RC1, a resource receiver domain is the IP address $IP_{receiver\ 1}$ of the resource receiver of the RC1, a content of the resource certificate domain is the RC1, and the parent certificate identifier domain points to the node where the resource certificate RC held by the resource issuer of the RC1 is located, the child certificate identifier domain is NULL, the child certificate is not issued to the current node, and the IP address prefix and the AS number contained in the certificate are obtained by parsing the RC1 via the resource transaction module.

In 4.2.1.7.3, a transaction success message is sent to the resource transaction module of the resource issuer; then, switch to 4.2.1.9.

In 4.2.1.8, if the resource transaction module of the resource receiver does not receive the rc_issue or the transaction content obtained from the transaction content domain of the rc_issue is not the resource certificate RC1, a transaction failure message is sent to the resource transaction module of the resource issuer; then, switch to 4.2.1.10.

In 4.2.1.9, if the resource transaction module of the resource issuer of the RC1 receives the transaction success message sent from the resource transaction module of the resource receiver, the resource transaction module of the resource issuer of the RC sends the "transaction success" message to the display module, the display module displays the "transaction success"; then, switch to step 5.

In 4.2.1.10, if the resource transaction module of the resource issuer of the RC1 receives the transaction failure message sent from the resource transaction module of the resource receiver, the resource issuer of the RC1 deletes the node where the certificate RC1 is located in the resource tree, and meanwhile, the resource transaction module of the RC1 sends an "operation failure" message and an operation failure cause (the cause is that the certificate RC1 is not received correctly) to the display module, the display module displays the "operation failure" message and the operation failure cause; then, switch to step 5.

In 4.2.2, at the moment, the resource transaction module of the resource transaction application client receives a message of revoking the RC (setting as RC2) from the resource issuer, wherein the message of revoking the RC2 includes a holder of the resource certificate RC (serving as the resource receiver) and the pre-revoked resource certificate RC, and revokes the certificate RC2 according to the certificate revoking method in 4.2.2.1 to 4.2.2.7.

In 4.2.2.1, the resource transaction module of the resource issuer sets an instruction of revoking the RC2 according to the message of revoking the RC2, wherein the instruction of revoking the RC2 includes the holder of the resource certificate RC and the pre-revoked resource certificate RC2, and sends a specific content of the RC2 to the display module, and the display module displays the specific content of the RC2.

In 4.2.2.2, the resource issuer and the holder of the pre-revoked certificate RC2 (serving as the resource receiver) execute bidirectional authorization via a method including the following steps.

In 4.2.2.2.1, the resource transaction module of the resource issuer checks whether a node where the certificate RC2 is located (setting as $V_{rc2}$), belongs to a leaf node in the resource tree via a method including the following steps.

In 4.2.2.2.1.1, let a variable node v be the root node $V_0$ of the resource tree.

In 4.2.2.2.1.2, the node $V_{rc2}$ is found via a method including: obtaining a child node v1 from a value in a child certificate identifier domain of v, and determining whether a value of a resource certificate domain of the v1 is namely the RC2 held by the resource issuer, if the value is equivalent to the RC2, the node v1 being namely the $V_{rc2}$, switching to 4.2.2.2.1.4, and if the value is not equivalent to the RC2, switching to 4.2.2.2.1.3.

In 4.2.2.2.1.3, let v be a child node pointed (i.e., v1) by the child certificate identifier of the v; and switch to 4.2.2.2.1.2.

In 4.2.2.2.1.4, check whether a child certificate identifier of the $V_{rc2}$ is NULL; if the child certificate identifier of the $V_{rc2}$ is NULL, the $V_{rc2}$ is a leaf node, switch to 4.2.2.2.2 to execute a specific cancelling operation; and if the child certificate identifier of the $V_{rc2}$ is not NULL, switch to 4.2.2.2.1.5.

In 4.2.2.2.1.5, at the moment, the $V_{rc2}$ is not a leaf node, and the node $V_{rc2}$ is capable of being revoked only after the certificate holder revokes a resource subtree under the node $V_{rc2}$, executing 4.2.2.2.1.6.

In 4.2.2.2.1.6, let the $V_{rc2}$ be a child node pointed by the child certificate identifier of the $V_{rc2}$; then, switch to 4.2.2.2.1.4.

In 4.2.2.2.2, the resource transaction module of the resource issuer constructs an RC2 revocation message rc_revoke_request based on the UDP, wherein contents of the rc_revoke_request include a certificate identifier to be revoked (an identifier of the RC2 at the moment), a random number r, and an address of the certificate holder (i.e., the resource receiver); and the resource transaction module of the resource issuer sends the rc_revoke_request to the holder of the resource receiver (the holder of the RC2 here); and the resource issuer initializes a second number of resending times m2 to be 0, and starts a revocation request sending timer corresponding to the RC2.

In 4.2.2.2.3, the resource issuer of the RC2 checks whether the revocation request sending timer is overtime, and if the revocation request sending timer is not overtime; then, switch to 4.2.2.2.4; if the revocation request sending timer is overtime, and m2 is less than the maximum number of resending times M, m2 is increased by 1, the rc_revoke_request is resent to the resource transaction module of the resource receiver, the resource issuer starts the issuance request sending timer corresponding to the RC2; then, switch to 4.2.2.2.4; if m2 is equal to M, the revocation request is failed, the resource transaction module of the resource issuer sends "operation failure" and an operation failure cause (the cause is that the revocation request message sending is overtime) to the display module, the display module displays the "operation failure" and the operation failure cause; then, switch to step 5.

In 4.2.2.2.4, a resource transaction module of the resource issuer of the RC2 determines whether a revocation request reply message rc_revoke_reply sent from the resource transaction module of the resource receiver is received, wherein the rc_revoke_reply includes the message (rc_revoke_request) received by the resource receiver, whether the operation of the resource issuer is agreed, and a random number. If the rc_revoke_reply is not received, the resource transaction module of the resource issuer sends a failure message and an operation failure cause (the cause is that the revocation request reply message sent from the resource receiver is not received) to the display module; then, switch to step 5; if the rc_revoke_reply is received, a format and a content of the rc_revoke_reply are checked, if the format is wrong, the message is discarded, the resource transaction module sends a failure message and an operation failure cause (the cause is that the format of the revocation request reply message sent from the resource receiver is wrong) to the display module; then, switch to step 5; if the format is correct, a reply message in the rc_revoke_reply is checked, if the reply message is to reject the revocation operation, the resource transaction module sends "operation failure" and an operation failure cause (the cause is that the certificate holder disagrees to revoke the certificate) to the display module, the display module displays the "operation failure" and the operation failure cause; then, switch to step 5; and if the reply message is to agree the revocation operation request, switch to 4.2.2.3.

In 4.2.2.3, the resource transaction module of the resource issuer of the RC2 checks whether the node (setting as v1) where the RC2 is located is a leaf node in the resource tree according to an identifier of the RC2 (i.e., determining whether the value of the child certificate identifier domain of the v1 is NULL), and if the v1 is a leaf node (i.e., the value of the child certificate identifier domain of the v1 is NULL), switch to 4.2.2.4; if the v1 is not a leaf node, indicating that the holder of the RC2 does not delete the resource subtree of the RC2 completely, and the RC2 being not in conformity with a revoking condition, "operation failure" and an operation failure cause (the cause is that the holder of the RC2 returns an RC revocation consent request without completely revoking child resources, breaching an agreement or suffering an attack) are sent to the display module; then, switch to step 5.

In 4.2.2.4, the resource transaction module of the resource issuer of the RC2 constructs an RC2 transaction revoking message rc_revoke according to the resource transaction structure, wherein the rc_revoke includes the resource issuer (the issuer of the RC2), the transaction receiver (the holder of the RC2), the transaction type (the RC revocation), the transaction content (the specific content of the RC2), the transaction attribute (NULL), the transaction evidence (the rc_revoke_reply message), a random number+1 issued by the holder of the RC2, and a signature of the resource issuer of the RC2 on the transaction; and the resource transaction module of the resource issuer sends the rc_revoke to the resource transaction module of the resource receiver through the blockchain network.

In 4.2.2.5, if the resource transaction module of the resource receiver receives the rc_revoke sent from the resource transaction module of the resource issuer, the resource transaction module of the resource receiver executes a delete operation according to the transaction type (RC revocation) and the transaction content to delete the resource certificate RC2, and meanwhile, modifies the resource tree, deletes the node v1 where the RC2 is located, and deletes a child certificate identifier pointing to the node v1 in a child certificate identifier domain of a father node of the v1. The transaction is successful at the moment. The resource transaction module of the resource receiver records the transaction in the distributed ledger, and the resource transaction module of the resource receiver sends a transaction success message to the resource transaction module of the resource issuer; then, switch to 4.2.2.6; otherwise, a transaction failure message is sent to the resource transaction module of the resource issuer, and then switch to 4.2.2.7.

In 4.2.2.6, if the resource transaction module of the resource issuer of the RC2 receives the transaction success message sent from the resource transaction module of the resource receiver, "transaction success" is sent to the display module, and the display module displays the "transaction success"; then, switch to step 5.

In 4.2.2.7, if the resource issuer receives the transaction failure message, "operation failure" is sent to the display module and an operation failure cause (the cause is that the resource deletion is failed) is prompted, and the display module displays the "operation failure" and the operation failure cause; then, switch to step 5.

In 4.2.3, at the moment, the resource transaction module of the resource transaction application client receives an RC3 overwriting message such as expiration time modifying and certificate serial number of RC (setting as RC3) not related to public and private keys and resource allocation from the resource issuer, and overwrites the certificate RC3 according to the certificate overwriting method in 4.2.3.1 to 4.2.3.6.

In 4.2.3.1, a resource transaction module of a resource issuer of the RC3 sets an RC3 overwriting instruction, wherein contents of the RC3 overwriting instruction include the currently effective RC3, a holder of the resource certificate RC3, an RC3 identifier, and an attribute value capable of being modified by an overwriting operation (including a certificate expiration time and an integer serial number); if the attribute value to be overwritten does not meet a value range (for example, the expiration time of the RC3 is earlier than the existing expiration time value of the RC3), sends an error message to the display module, and resets the attribute value to be overwritten; then, switch to 4.2.3.2.

In 4.2.3.2, the resource issuer of the RC3 and a resource holder of the certificate RC3 (serving as the resource receiver) execute bidirectional authorization, specifically including the following steps.

In 4.2.3.2.1, the resource transaction module of the resource issuer of the RC3 constructs an RC3 overwriting request message rc_overwrite1_request based on a UDP, wherein contents of the rc_overwrite1_request include a certificate identifier to be overwritten, a random number r, and an ID of the certificate holder; and the resource transaction module of the resource issuer sends the RC3 overwriting request message rc_overwrite1_request to a certificate holder through the blockchain network. The resource transaction module of the resource issuer initializes a third number of resending times m3 to be 0, and starts an overwriting request sending timer corresponding to the RC3.

In 4.2.3.2.2, the resource transaction module of the resource issuer of the RC3 checks whether the overwriting request sending timer of the RC3 is overtime, and if the overwriting request sending timer is not overtime, switch to 4.2.3.2.3; if the overwriting request sending timer of the RC3 is overtime, and m3 is less than the maximum number of resending times M, m3 is increased by 1, the resource transaction module of the resource issuer resends the rc_overwrite1_request of the RC3, and starts the overwriting request sending timer of the RC3; switch to 4.2.3.2.2. If the overwriting request sending timer of the RC3 is overtime and m3 is equal to M, the overwriting request of the RC3 is failed, "operation failure" and an operation failure cause (the cause is that the overwriting request messaging is failed to send) are sent to the display module, and the display module displays the "operation failure" and the operation failure cause; then, switch to step 5.

In 4.2.3.2.3, the resource transaction module of the resource issuer of the RC3 determines whether an overwriting request reply message rc_overwrite1_reply of the RC3 sent from the resource transaction module of the certificate holder is received, wherein contents of the rc_overwrite1_reply include the message (rc_overwriter1_request) received by the resource receiver, whether an operation of the resource issuer is agreed, and a random number; if the rc_overwrite1_reply is not received, the resource transaction module of the resource issuer sends "operation failure" and an operation failure cause (the cause is that the overwriting request reply message sent from the resource transaction module of the resource receiver is not received) to the display module; then, switch to step 5; if the rc_overwrite1_reply is received, a format and a content of the rc_overwrite1_reply are checked, if the format is wrong, the message is discarded, and the resource transaction module of the resource issuer sends "operation failure" and an operation failure cause (the cause is that the format of the overwriting request reply message is wrong) to the display module; then, switch to step 5; if the format is correct, the rc_overwrite1_reply is checked, if the rc_overwrite1_reply is to reject the overwriting operation request, "operation failure" and an operation failure cause (the cause is that the certificate holder disagrees the operation) to the display module, and the display module displays the "operation failure" and the operation failure cause; then, switch to step 5; and if the reply message in the rc_overwrite1_reply is to agree the operation request, then execute 4.2.3.3.

In 4.2.3.3, the resource transaction module of the resource issuer of the RC3 constructs an RC3 overwriting message rc_overwrite1 according to the resource transaction structure, wherein the rc_overwrite1 includes the resource issuer (the issuer of the RC3 at the moment), the resource receiver (the holder of the RC3 at the moment), the transaction type, (the RC3 overwriting at the moment), the transaction content, (content of new RC3' at the moment, i.e., overwritten content of the certificate RC3 to be overwritten), the transaction attributes (including the transfer attribute and the expired attribute), the transaction evidence (rc_overwrite1_reply message, and a random number+1 issued by the holder of the RC3 at the moment), and a signature of the resource issuer of the RC3 on the transaction; and the resource transaction module of the resource issuer of the RC3 sends the rc_overwrite1 to the resource transaction module of the resource receiver through the blockchain network.

In 4.2.3.4, if the resource transaction module of the resource receiver receives the rc_overwrite1 sent from the resource transaction module of the resource issuer, the resource transaction module of the resource receiver replaces the RC3 to be overwritten with RC3' according to the transaction type (overwriting) and the transaction content, the transaction is successful at the moment; and the resource transaction module of the resource receiver modifies the resource tree: modifying information of a resource certificate domain of a node where the resource certificate RC3 is located, i.e., replacing the resource certificate domain (information of the RC3 before modification) with information of the RC3', and recording, by the resource transaction module of the resource receiver, the transaction in the distributed ledger; meanwhile, sending, by the resource transaction module of the resource receiver, a transaction success message to the resource transaction module of the resource issuer, and switching to 4.2.3.5; otherwise, sending a transaction failure message to the resource transaction module of the resource issuer, and switching to 4.2.3.6.

In 4.2.3.5, if the resource transaction module of the resource issuer of the RC3 receives the transaction success message sent from the resource transaction module of the resource receiver, and sends "transaction success" to the display module, the display module displays the "transaction success"; then, switch to step 5.

In 4.2.3.6, if the resource issuer of the RC3 receives the transaction failure message, "operation failure" and an operation failure cause (the cause is that the resource receiver fails to overwrite the certificate) are sent to the display module, and the display module displays the "operation failure" and the operation failure cause; then, switch to step 5.

In 4.2.4, at the moment, the resource transaction module of the resource transaction application client receives the message of modifying the RC (setting as RC4) related to resource allocation adjustment from the resource issuer, the resource transaction module of the resource issuer needs to revoke the old certificate RC4, and then sets and issues a new certificate (setting as RC5) according to the message of modifying via a method including the following steps.

In 4.2.4.1, the RC4 is revoked according to the certificate revoking method in 4.2.2.

In 4.2.4.2, an instruction of issuing the new certificate (setting as RC5) is set according to the message of modifying, and the RC5 is issued according to the certificate issuing method in 4.2.1; then, switch to step 5.

In 4.2.5, at the moment, the resource transaction module of the resource transaction client receives the message issued by the ROA (setting as ROA1) from the resource issuer, and issues the ROA1 according to the ROA issuing method in 4.2.5.1 to 4.2.5.6.

In 4.2.5.1, a resource transaction module of a resource issuer of the ROA1 sets an ROA issuing instruction, wherein contents of the ROA1 issuing instruction include the pre-issued IP address prefix and AS number.

In 4.2.5.2, the resource transaction module of the resource issuer of the ROA1 checks whether the IP address prefix and the AS number contained in the ROA1 are possessed by the resource issuer of the ROA1 according to an IP address prefix and an AS number in the ROA1 issuing instruction, i.e., checks whether the IP address prefix and the AS number contained in the pre-issued ROA pre-issued are contained in an IP address prefix and an AS number bound to the resource certificate possessed by the resource issuer of the ROA1; if not contained, then a conflict occurs; then, switch to 4.2.5.2.2; and if contained, then no conflict occurs; then, switch to 4.2.5.2.1.

In 4.2.5.2.1, the resource transaction module of the resource issuer of the ROA1 checks whether the pre-issued IP address prefix and AS number resource are already issued, queries the ROA transaction record of the resource issuer of the ROA1 recorded in the distributed ledger, obtains all the ROAs already issued by the resource issuer of the ROA1, and checks whether the IP address prefixes and the AS numbers contained in all the issued ROAs are overlapped with the pre-issued IP address prefix and AS number by comparison; if overlapped, then a conflict occurs (indicating that the IP address prefix and the AS number resource are already issued), switch to 4.2.5.2.3; and if no conflict occurs, switch to 4.2.5.3.

In 4.2.5.2.2, the resource transaction module of the resource issuer of the ROA1 sends an "operation failure" message and a cause that (the cause is that a resource conflict occurs, and the IP address prefix and the AS number held by the resource issuer do not include the IP address prefix and the AS number contained in the pre-issued ROA) to the display module, and the display module displays the "operation failure" message that includes the operation failure cause; then, switch to step 5.

In 4.2.5.2.3, the resource transaction module of the resource issuer of the ROA1 sends an "operation failure" message and a cause (the cause is that the IP address prefix and the AS number contained in the pre-issued ROA are already issued) to the display module, and the display module displays the "operation failure" message that includes the operation failure cause; then, switch to 4.2.5.2.4.

In 4.2.5.2.4, the resource transaction module of the resource issuer of the ROA1 checks whether the instruction of "abandoning the transaction" is received from the resource issuer, if received, switch to step 5; otherwise, switch to 4.2.5.2.5.

In 4.2.5.2.5, the resource transaction module of the resource issuer of the ROA1 determines whether a revocation message (revoking the already issued ROA conflicting with the ROA1) is received from the resource issuer; if the revocation message is received, then the already issued ROA conflicting with the pre-issued ROA1 is revoked; then, switch to 4.2.5.2; and if the revocation message is not received, switch to step 5.

In 4.2.5.3, a checking result is that no conflict occurs, the resource transaction module of the resource issuer of the ROA1 sends the IP address prefix and the AS number in the ROA1 issuing instruction to the resource certificate generating module of the resource issuer; and the resource certificate generating module of the resource issuer generates the ROA1 according to contents (IP address prefix and AS number) of the ROA1 issuing instruction.

In 4.2.5.4, the resource transaction module of the resource issuer of the ROA1 constructs an ROA1 issuance transaction message (roa_issue) according to the defined resource transaction structure, wherein the roa_issue includes the resource issuer (the issuer of the ROA1 at the moment), the resource receiver (the receiver of the ROA1 at the moment), the transaction type, (the ROA1 issuance at the moment), the transaction content, (the specific content of the ROA1 at the moment), the transaction attributes (including the transfer attribute and the expired attribute, wherein when the transfer attribute is NULL, the expired attribute indicates whether the ROA has a time limit), and the transaction evidence (NULL at the moment), and a signature of the resource issuer of the ROA1 on the transaction; and the resource transaction module of the resource issuer of the ROA1 sends the ROA1 issuance transaction message roa_issue to the resource receiver through the blockchain network.

In 4.2.5.5, if the resource transaction module of the resource receiver receives the roa_issue sent from the resource transaction module of the resource issuer of the ROA1, the message is parsed to obtain the transaction type (ROA1 issuance) and the transaction content (the specific content of the ROA1); the transaction is successful at the moment, the resource transaction module of the resource receiver records the transaction in the distributed ledger, and the resource transaction module of the resource receiver sends a transaction success message to the resource transaction module of the resource issuer; then, switch to 4.2.5.6; if the transaction is unsuccessful, the resource transaction module of the resource receiver sends a transaction failure message to the resource transaction module of the resource issuer; then, switch to 4.2.5.7.

In 4.2.5.6, if the resource issuer of the ROA1 receives the transaction success message from the resource receiver, "transaction success" is sent to the display module, and the display module displays the "transaction success"; then, switch to step 5.

In 4.2.5.7, if the resource issuer of the ROA receives the transaction failure message from the resource receiver, the resource transaction module of the resource issuer of the ROA1 deletes the ROA1, and sends an operation failure message and an operation failure cause that (the cause is that the resource receiver fails to acquire the transaction content) to the display module, and the display module displays the "operation failure" and the operation failure cause; then, switch to step 5.

In 4.2.6, at the moment, the resource transaction module of the resource transaction client receives an ROA (setting as ROA2) revocation message from the resource issuer, and revokes the ROA2 according to the ROA revoking method in 4.2.6.1 to 4.2.6.5.

In 4.2.6.1, a resource transaction module of the resource transaction application client of a resource issuer of the ROA2 sets an ROA2 revoking instruction, wherein the ROA2 revoking instruction includes a holder of the ROA2 and an identifier of the ROA2, and sends a specific content of the ROA2 to the display module, and the display module displays the specific content of the ROA2.

In 4.2.6.2, the resource transaction module of the resource issuer of the ROA2 constructs an ROA2 revocation transaction message roa_revoke according to the defined resource transaction structure, wherein contents of the roa_revoke include the resource issuer (the issuer of the ROA2 at the moment), the resource receiver (the holder of the ROA2 at the moment), the transaction type, (the ROA2 revocation at the moment), the transaction content, (the identifier of the ROA2 at the moment), the transaction attributes (NULL at the moment), and the transaction evidence (NULL at the moment), and a signature of the resource issuer of the ROA2 on the transaction; and the resource transaction module of the resource issuer sends the roa_revoke to the resource transaction module of the resource receiver through the blockchain network.

In 4.2.6.3, if the resource transaction module of the resource receiver receives the roa_revoke sent from the resource transaction module of the resource issuer, the message is parsed to obtain the transaction type (the ROA2 revocation at the moment) and the transaction content (the specific content of the ROA2), and the resource transaction module of the resource receiver deletes the ROA2, the transaction is successful at the moment, and the resource transaction module of the resource receiver sends a transaction success message to the resource transaction module of the resource issuer; then, switch to 4.2.6.4; if the transaction is unsuccessful, the resource transaction module of the resource receiver sends a transaction failure message to the resource transaction module of the resource issuer; then, switch to 4.2.6.5.

In 4.2.6.4, if the resource transaction module of the resource issuer receives the transaction success message sent from the resource receiver, the resource transaction module of the resource receiver deletes the ROA2, records the transaction in the distributed ledger, sends "transaction success" to the display module, and the display module displays the "transaction success"; then, switch to step 5.

In 4.2.6.5, if the resource transaction module of the resource issuer receives the transaction failure message, an operation failure notification and an operation failure cause (the cause is that the resource receiver fails to delete the ROA2) are sent to the display module, and the display module displays the "operation failure" and the operation failure cause; then, switch to step 5.

In 4.2.7, at the moment, the resource transaction module of the resource transaction application client receives an ROA (setting as ROA3) modifying instruction from the resource issuer, then a resource transaction module of a resource issuer of the ROA3 needs to revoke the ROA3 first, and then generates a new ROA3' according to the modified content, and issues a new certificate ROA3' via a method including the following steps.

In 4.2.7.1, the ROA3 is revoked according to the ROA revoking method in 4.2.6.

In 4.2.7.2, the new ROA3' is generated according to the modified content, the ROA3' is issued according to the ROA issuing method in 4.3.5; then, switch to step 5.

In step 5, switch to 4.2. The resource transaction module of the resource transaction application client waits to receive next message from the resource issuer to carry out next transaction.

What is claimed is:

1. A method for bidirectional authorization of a blockchain-based resource public key infrastructure, comprising the following steps of:

step 1: constructing a blockchain-based resource public key infrastructure system RPKIB, wherein the RPKIB is composed of a resource issuer, a resource transaction application client, a resource receiver and a blockchain network;

the blockchain network is connected with the resource issuer, the resource receiver and the resource transaction application client; the resource issuer and the resource receiver serve as a node of the blockchain network, and the resource transaction application client is installed on the node where the resource issuer and the resource receiver are located; the resource transaction application client takes various operations of a resource certificate (RC) and route origin authorization (ROA) as transactions through the blockchain network, and saves transaction records in a distributed ledger; and the distributed ledger exists in all blockchain nodes;

the resource issuer is a server with the resource transaction application client installed thereon, is connected with the blockchain network, and is a node of the blockchain network; the resource issuer and the resource receiver serve as both parties of a transaction;

after obtaining the consent of both parties through bidirectional authorization, the both parties of the transaction conduct transactions through the blockchain network and record the transactions in the distributed ledger;

the resource receiver is a server with the resource transaction application client installed thereon, is connected with the blockchain, and is a node of the blockchain network;

the resource transaction application client is installed on the resource issuer and the resource receiver, and is composed of a resource transaction module, a resource certificate generating module and a display module;

the resource certificate generating module is connected with the resource transaction module; the resource certificate generating module receives pre-issued RC and ROA information from the resource transaction module, and generates a resource certificate RC with the same definition as that of the resource public key infrastructure RPKI according to the pre-issued RC; the resource certificate generating module creates route origin authorization ROA for a resource held by the resource receiver according to the pre-issued ROA information; the ROA comprises three parts: one AS number, one IP address prefix list, and an optional content for limiting an IP address prefix; and the resource certificate generating module sends the RC and the ROA generated to the resource transaction module;

the resource transaction module is connected with the resource issuer or the resource receiver, the resource certificate generating module, the display module and the blockchain network; the resource transaction module receives the RC or the ROA from the resource certificate generating module, receives an operation instruction regarding the RC or the ROA from the resource issuer, conducts a transaction through the blockchain network, and provides various operation services of RC or ROA resource transactions for the resource issuer, and one operation is one transaction in the RPKIB; the resource transaction module sends a transaction success message to the display module when the transaction is successful, and sends a conflict cause and an operation failure cause obtained by conflict detection, and a transaction result to the display module when the transaction is unsuccessful; and sends the RC and the ROA to the display module when revoking the operation; and the display module is connected with the resource transaction module, which receives the transaction success message or the conflict reason, the operation failure reason and the transaction result when the transaction is unsuccessful, from the resource transaction module, and displays the same; and receives the RC and the ROA from the resource transaction module when revoking the operation, and display specific contents of the RC and the ROA;

step 2: defining a resource transaction structure, wherein the resource transaction structure comprises a transaction initiator, a transaction receiver, a transaction type, a transaction content, a transaction attribute, a transaction evidence and a transaction signature given by the transaction initiator; the transaction initiator refers to an address of the resource issuer, and the transaction receiver is an address of the resource receiver; the transaction signature refers to a digital signature for a transaction initiated by the transaction initiator in the blockchain network; seven transaction types are provided, which are respectively: RC issuance, RC revocation, RC overwriting, RC modification, ROA issuance, ROA revocation and ROA modification; the transaction content is a content of the RC or the ROA corresponding to the transaction; the transaction attribute comprises a transfer attribute and an expired attribute; the transfer attribute represents whether an IP address resource allocated to an institution is capable of being reallocated to another resource authorization entity, the transfer attribute being 0 indicates that the resource issuer does not want to sub-allocate an IP address prefix resource which is allocated to an institution, and the institution at the moment is called a terminal node, the IP address resource and an AS number resource possessed thereof are incapable of being reallocated, and only the terminal node is able to issue the ROA; the transfer attribute being 1 indicates that the resource issuer wants to sub-allocate an IP address prefix resource which is allocated to an institution; the expired attribute shows whether the IP address resource has a lease term, the expired attribute being 0 indicates that the lease term is not expired, while the expired attribute being 1 indicates that the lease term is expired, and the IP address resource needs to be released and returned to an original resource authorization entity; the transaction evidence indicates that the resource issuer and the resource receiver sign twice, and an evidence agreed by both parties consists of a message and a random number of transactions of both parties; the transaction signature given by the transaction initiator shows that the transaction initiator and the transaction receiver reach an agreement on the transaction; and a field of a transaction signature given by a transaction initiator of an ROA related operation is NULL;

step 3: defining a resource tree, wherein the resource tree is constructed by the resource transaction module according to a valid resource certificate, and one node of the resource tree comprises seven domains, which are respectively: the resource issuer, the resource receiver, the resource certificate, a parent certificate identifier, a child certificate identifier, an IP address prefix contained in the certificate and an AS number contained in the certificate; the node is linked to a child node through the child certificate identifier domain, and is linked to a parent node of the node through the parent certificate identifier domain; the IP address prefix contained in the certificate and the AS number contained in the certificate are both obtained by the resource transaction module through parsing the certificate; and the resource tree is saved in the distributed ledger, and is jointly maintained by the resource issuer and the resource receiver;

step 4: carrying out, by the blockchain-based resource public key infrastructure system RPKIB, bidirectional authorization on a resource operation between the resource issuer and the resource receiver, and after each bidirectional authorization passes, conducting, by the resource issuer and the resource receiver, a transaction corresponding to the resource operation via a method comprising:

4.1: initializing, by the resource transaction module, a root node of the resource tree, and letting the root node be $V_0$, creating a first block of the blockchain with a regional Internet registry RIR as a creator of the blockchain, and using a resource certificate possessed by the RIR as the root node $V_0$ of the resource tree, wherein a resource issuer and a resource receiver of the $V_0$ are both IP addresses of the RIR, a resource certificate of the $V_0$ is the resource certificate held by the RIR, a parent certificate identifier of the $V_0$ is NULL, a child certificate identifier of the $V_0$ is NULL, an IP address prefix of the $V_0$ is an IP address prefix possessed by the RIR, and an AS number is an AS number possessed by the RIR; and recording the $V_0$ in the distributed ledger;

4.2: receiving, by the resource transaction module of the resource transaction application client, a message from the resource issuer, and if a message of issuing a resource certificate RC1 is received, switching to 4.2.1; if a message of revoking a resource certificate RC2 is received, switching to 4.2.2; if a message of overwriting a resource certificate RC3 is received, switching to 4.2.3; if a message of modifying an RC4 related to resource allocation adjustment is received, switching to 4.2.4; if a message of issuing an ROA1 is received, switching to 4.2.5; if a message of revoking an ROA2 is received, switching to 4.2.6; and if a message of modifying an ROA3 is received, switching to 4.2.7:

4.2.1: at the moment, receiving, by the resource transaction module, the message of issuing the RC1 from the resource issuer, the message of issuing the RC1 containing an IP address of the resource receiver ($IP_{receiver\ 1}$), as well as an IP address prefix ($IP_{prefix\ 1}$) and an AS number (AS1) pre-issued to the resource receiver, and issuing the certificate RC1 according to the certificate issuing method in 4.2.1.1 to 4.2.1.10:

4.2.1.1: setting, by the resource transaction module, an RC1 issuing instruction, the RC1 issuing instruction comprising the $IP_{receiver\ 1}$, the $IP_{prefix\ 1}$ and the AS1;

4.2.1.2: carrying out, by the resource transaction module, the following operations according to contents of the RC1 issuing instruction:

4.2.1.2.1: searching, by the resource transaction module, the resource tree according to the $IP_{prefix\ 1}$ and the AS1 in the RC1 issuing instruction, and checking whether the pre-issued certificate RC1 conflicts with the certificate RC already issued in the resource tree via a method comprising:

4.2.1.2.1.1: checking whether the pre-issued $IP_{prefix\ 1}$ and AS1 are possessed by the resource issuer, and letting the IP address of the resource issuer be $IP_{issuer1}$ via a method comprising:

4.2.1.2.1.1.1: parsing, by the resource transaction module of the resource issuer, the self-held resource certificate $RC_{issuer}$, and obtaining the IP address prefix and the AS number contained in the $RC_{issuer}$;

4.2.1.2.1.1.2: checking, by the resource transaction module of the resource issuer, whether the pre-issued $IP_{prefix\ 1}$ and AS1 are contained in the IP address prefix and the AS number contained in the $RC_{issuer}$, if the pre-issued $IP_{prefix\ 1}$ and AS1 are contained in the IP address prefix and the AS number contained in the $RC_{issuer}$, the pre-issued $IP_{prefix\ 1}$ and AS1 is possessed by the resource issuer, and no conflict occurs, switching to 4.2.1.2.1.2; and if the pre-issued $IP_{prefix\ 1}$ and AS1 are not contained in the $RC_{issuer}$, the pre-issued $IP_{prefix\ 1}$ and AS1 is possessed by the resource issuer, and a conflict occurs, switching to 4.2.1.2.1.3;

4.2.1.2.1.2: checking whether the $IP_{prefix\ 1}$ and the AS1 contained in the pre-issued certificate RC1 are already issued, if a checking result is "not issued", switching to 4.2.1.3; and if a checking result is that "the pre-issued $IP_{prefix\ 1}$ and AS1 are already issued, resulting in a conflict", switching to 4.2.1.2.1.4;

4.2.1.2.1.3: sending, by the resource transaction module, a "resource conflict" message to the display module, and displaying, by the display module, the "resource conflict" message, wherein the message contains a resource conflict cause, the resource conflict cause is that "the IP address prefix resource and the AS number contained in the pre-issued certificate RC are not possessed by a current certificate issuer"; then, switching to step 5;

4.2.1.2.1.4: sending, by the resource transaction module, a "resource conflict" message to the display module, and displaying, by the display module, the "resource conflict" message, wherein the message contains a resource conflict cause, the resource conflict cause is that "the IP address prefix and the AS number contained in the pre-issued certificate RC are already issued"; then, switching to 4.2.1.2.2;

4.2.1.2.2: checking, by the resource transaction module, whether an instruction of "abandoning the transaction" is received from the resource issuer, and if the instruction is received, switching to step 5; otherwise, switching to 4.2.1.2.3;

4.2.1.2.3: determining, by the resource transaction module, whether a revocation message of revoking an issued resource conflicting with the pre-issued RC1 is received from the resource issuer, and if the revocation message is received, revoking the issued RC conflicting with the pre-issued RC1; and if the revocation message is not received, switching to step 5;

4.2.1.3: sending, by the resource transaction module, the $IP_{prefix\ 1}$ and the AS1 in the RC1 issuing instruction to the resource certificate generating module; then, switching to 4.2.1.4;

4.2.1.4: generating, by the resource certificate generating module, a resource certificate according to the $IP_{prefix\ 1}$ and the AS1 received from the resource transaction module, and naming the certificate as the RC1;

4.2.1.5: carrying out, by the resource issuer and the resource receiver of the RC1, bidirectional authorization via a method comprising:

4.2.1.5.1: constructing, by the resource transaction module of the resource issuer of the RC1, an RC1 issuance request message rc_issue_request based on a UDP, and sending the rc_issue_request to the resource transaction module of the resource receiver through the blockchain network; initializing, by the resource issuer of the RC1, a number of resending times m to be 0, starting an issuance request sending timer corresponding to the RC1, and waiting for receiving an RC1 issuance request reply message from the resource receiver;

4.2.1.5.2: checking, by the resource issuer of the RC1, whether the issuance request sending timer is overtime, and if the issuance request sending timer is not overtime, switching to 4.2.1.5.3; if the issuance request sending timer is overtime, and m is less than a maximum number of resending times M, wherein M is a positive integer, increasing m by 1, resending the rc_issue_request to the resource receiver, restarting the issuance request sending timer corresponding to the RC1; then, switching to 4.2.1.5.3; if the issuance request sending timer is overtime and m is equal to M, the issuance request being failed, deleting, by the resource issuer, the RC1, and sending, by the resource transaction module, operation failure and an operation failure cause which is "overtime sending" to the display module to display; then, switching to step 5;

4.2.1.5.3: determining, by the resource issuer of the RC1, whether the issuance request reply message rc_issue_reply is received from the resource receiver; if the rc_issue_reply is not received, sending, by the resource transaction module of the resource issuer of the RC1, a failure message and an operation failure cause that "the issuance request reply message sent from the resource receiver is not received" to the display module; then, switching to step 5; if the rc_issue_reply is received, checking a format and a content of the rc_issue_reply, if the format is wrong, discarding the rc_issue_rep1, sending, by the resource transaction module, a failure message and an operation failure cause that "the format of the issuance request reply message is wrong" to the display module; then, switching to step 5; if the format is correct, checking the content of the rc_issue_reply message, if the content is to reject the issuance, deleting, by the resource issuer, the RC1, and meanwhile, sending, by the resource issuer, an operation failure message and an operation failure cause that "the resource receiver disagrees to issue the certificate" to the display module of the resource transaction application client, displaying, by the display module, the operation failure message and the operation failure cause; then, switching to step 5; and if the content in the rc_issue_reply is to agree the issuance operation request, executing 4.2.1.6;

4.2.1.6: constructing, by the resource transaction module of the resource issuer, an issuance transaction message rc_issue of the RC1 according to the resource transaction structure; and sending, by the resource issuer, the rc_issue to the resource receiver through the blockchain network;

4.2.1.7: if the resource transaction module of the resource receiver receives the rc_issue sent from the resource issuer and obtains a specific transaction content, which is namely the resource certificate RC1, from a transaction content domain of the rc_issue, the transaction being successful, and recording, by the resource transaction module of the resource receiver, the transaction into the distributed ledger, and creating, by the resource transaction module of the resource receiver, a new node, which is namely an RC node, for the resource tree, sending a transaction success message to the resource transaction module of the resource issuer; then, switching to 4.2.1.9;

4.2.1.8: if the resource transaction module of the resource receiver does not receive the rc_issue or the transaction content obtained from the transaction content domain of the rc_issue is not the resource certificate RC1, sending a transaction failure message to the resource transaction module of the resource issuer; then, switching to 4.2.1.10;

4.2.1.9: if the resource transaction module of the resource issuer of the RC receives the transaction success message sent from the resource transaction module of the resource receiver, sending, by the resource transaction module of the resource issuer of the RC1, the "transaction success" message to the display module, and displaying, by the display module, the "transaction success"; then, switching to step 5;

4.2.1.10: if the resource transaction module of the resource issuer of the RC1 receives the transaction failure message sent from the resource transaction module of the resource receiver, deleting, by the resource issuer of the RC1, the node where the certificate RC1 is located in the resource tree, and meanwhile, sending, by the resource transaction module of the RC1, an "operation failure" message and an operation failure cause that "the certificate RC1 is not received correctly" to the display module, and displaying, by the display module, the "operation failure" message and the operation failure cause; then, switching to step 5;

4.2.2: at the moment, receiving, by the resource transaction module of the resource transaction application client, a message of revoking the RC2 from the resource issuer, wherein the message of revoking the RC2 comprises a holder of the resource certificate RC and the pre-revoked resource certificate RC, revoking the certificate RC2 according to the certificate revoking method in 4.2.2.1 to 4.2.2.7, and at the moment, the holder of the resource certificate RC serving as the resource receiver:

4.2.2.1: setting, by the resource transaction module of the resource issuer, an instruction of revoking the RC2 according to the message of revoking the RC2, wherein the instruction of revoking the RC2 comprises the holder of the resource certificate RC and the pre-revoked resource certificate RC2, sending a specific content of the RC2 to the display module, and displaying, by the display module, the specific content of the RC2;

4.2.2.2: executing, by the resource issuer and the holder of the pre-revoked certificate RC2, bidirectional authorization via a method comprising:

4.2.2.2.1: checking, by the resource transaction module of the resource issuer, whether a node where the certificate RC2 is located, i.e., $V_{rc2}$, belongs to a leaf node in the resource tree via a method comprising:

4.2.2.2.1.1: letting a variable node v be the root node $V_0$ of the resource tree;

4.2.2.2.1.2: finding the node $V_{rc2}$ via a method comprising: obtaining a child node v1 from a value in a child certificate identifier domain of v, and determining whether a value of a resource certificate domain of the v1 is namely the RC2 held by the resource issuer, if the value is equivalent to the RC2, the node v1 being namely the $V_{rc2}$, switching to 4.2.2.2.1.4, and if the value is not equivalent to the RC2, switching to 4.2.2.2.1.3;

4.2.2.2.1.3: letting v=v1; and switching to 4.2.2.2.1.2;

4.2.2.2.1.4: checking whether a child certificate identifier of the $V_{rc2}$ is NULL; if the child certificate identifier of the $V_{rc2}$ is NULL, the $V_{rc2}$ being a leaf node, switching to 4.2.2.2.2 to execute a specific revoking operation; and if the child certificate identifier of the $V_{rc2}$ is not NULL, switching to 4.2.2.2.1.5;

4.2.2.2.1.5: at the moment, the $V_{rc2}$ is not a leaf node, and the node $V_{rc2}$ is capable of being revoked only after the certificate holder revokes a resource subtree under the node $V_{rc2}$, executing 4.2.2.2.1.6;

4.2.2.2.1.6: letting the $V_{rc2}$ be a child node pointed by the child certificate identifier of the $V_{rc2}$; then, switching to 4.2.2.2.1.4;

4.2.2.2.2: constructing, by the resource transaction module of the resource issuer, an RC2 revocation message rc_revoke_request based on the UDP, and sending, by the resource transaction module of the resource issuer, the rc_revoke_request to the holder of the resource receiver, i.e., the RC2; and initializing, by the resource issuer, a second number of resending times m2 to be 0, and starting a revocation request sending timer corresponding to the RC2;

4.2.2.2.3: checking, by a resource issuer of the RC2, whether the revocation request sending timer is overtime, and if the revocation request sending timer is not overtime, switching to 4.2.2.2.4; if the revocation request sending timer is overtime, and m2 is less than the maximum number of resending times M, increasing m2 by 1, resending the rc_revoke_request to the resource transaction module of the resource receiver, and starting, by the resource issuer, the issuance request sending timer corresponding to the RC2; then, switching to 4.2.2.2.4; if m2 is equal to M, the revocation request being failed, sending, by the resource transaction module of the resource issuer, "operation failure" and an operation failure cause that "the revocation request message sending is overtime" to the display module, and displaying, by the display module, the "operation failure" and the operation failure cause; then, switching to step 5;

4.2.2.2.4: determining, by a resource transaction module of the resource issuer of the RC2, whether a revocation request reply message rc_revoke_reply sent from the resource transaction module of the resource receiver is received, if the rc_revoke_reply is not received, sending, by the resource transaction module of the resource issuer, a failure message and an operation failure cause that "the revocation request reply message sent from the resource receiver is not received" to the display module; then, switching to step 5; if the rc_revoke_reply is received, checking a format and a content of the rc_revoke_reply, if the format is wrong, discarding the message, sending, by the resource transaction module, a failure message and an operation failure cause that "the format of the revocation request reply message sent from the resource receiver is wrong" to the display module; then, switching to step 5; if the format is correct, checking a reply message in the rc_revoke_reply, if the reply message is to reject the revocation operation, sending, by the resource transaction module, "operation failure" and an operation failure cause that "the certificate holder disagrees to revoke the certificate" to the display module, and displaying, by the display module, the "operation failure" and the operation failure cause; then, switching to step 5; and if the reply message is to agree the revocation operation request, switching to 4.2.2.3;

4.2.2.3: checking, by the resource transaction module of the resource issuer of the RC2, whether the node v1 where the RC2 is located is a leaf node in the resource tree according to an identifier of the RC2, i.e., determining whether the value of the child certificate identifier domain of the v1 is NULL, and if the v1 is a leaf node, switching to 4.2.2.4; if the v1 is not a leaf node, indicating that the holder of the RC2 does not delete the resource subtree of the RC2 completely, and the RC2 being not in conformity with a revoking condition, sending "operation failure" and an operation failure cause that "the holder of the RC2 returns an RC revocation consent request without completely revoking child resources, breaching an agreement or suffering an attack" to the display module; switching to step 5;

4.2.2.4: constructing, by the resource transaction module of the resource issuer of the RC2, an RC2 transaction revoking message rc_revoke according to the resource transaction structure, and sending, by the resource transaction module of the resource issuer, the rc_revoke to the resource transaction module of the resource receiver through the blockchain network;

4.2.2.5: if the resource transaction module of the resource receiver receives the rc_revoke sent from the resource transaction module of the resource issuer, executing, by the resource transaction module of the resource receiver, a delete operation according to the transaction type and the transaction content to delete the resource certificate RC2, and meanwhile, modifying the resource tree: deleting the node v1 where the RC2 is located, and deleting a child certificate identifier pointing to the node v1 in a child certificate identifier domain of a father node of the v1, wherein the transaction is successful at the moment; recording, by the resource transaction module of the resource receiver, the transaction in the distributed ledger, and sending, by the resource transaction module of the resource receiver, a transaction success message to the resource transaction module of the resource issuer; then, switching to 4.2.2.6; otherwise, sending a transaction failure message to the resource transaction module of the resource issuer; then, switching to 4.2.2.7;

4.2.2.6: if the resource transaction module of the resource issuer of the RC2 receives the transaction success message sent from the resource transaction module of the resource receiver, sending "transaction success" to the display module, and displaying, by the display module, the "transaction success"; then, switching to step 5;

4.2.2.7: if the resource issuer receives the transaction failure message, sending "operation failure" to the display module and prompting an operation failure cause that "the resource is failed to delete", and displaying, by the display module, the "operation failure" and the operation failure cause; then, switching to step 5;

4.2.3: at the moment, the resource transaction module of the resource transaction application client receives an RC3 overwriting message not related to public and private keys and resource allocation from the resource issuer, and overwriting the certificate RC3 according to the certificate overwriting method in 4.2.3.1 to 4.2.3.6:

4.2.3.1: setting, by a resource transaction module of a resource issuer of the RC3, an RC3 overwriting instruction, wherein contents of the RC3 overwriting instruction comprise the currently effective RC3, a holder of the resource certificate RC3, an RC3 identifier, and an attribute value capable of being modified by an overwriting operation; if the attribute value to be overwritten does not meet a value range, sending an error message to the display module, and resetting the attribute value to be overwritten; then, switching to 4.2.3.2;

4.2.3.2: executing, by the resource issuer of the RC3 and a resource holder of the certificate RC3, i.e., the resource receiver, bidirectional authorization, specifically comprising:

4.2.3.2.1: constructing, by the resource transaction module of the resource issuer of the RC3, an RC3 overwriting request message rc_overwrite1_request based on a UDP, and sending, by the resource transaction module of the resource issuer, the rc_overwrite1_request to a resource transaction module of the certificate holder through the blockchain network; and initializing, by the resource transaction module of the resource issuer, a third number of resending times m3 to be 0, and starting an overwriting request sending timer corresponding to the RC3;

4.2.3.2.2: checking, by the resource transaction module of the resource issuer of the RC3, whether the overwriting request sending timer of the RC3 is overtime, and if the overwriting request sending timer is not overtime, switching to 4.2.3.2.3; if the overwriting request sending timer of the RC3 is overtime, and m3 is less than the maximum number of resending times M, increasing m3 by 1, resending, by the resource transaction module of the resource issuer, the rc_overwrite1_request of the RC3, and starting the overwriting request sending timer of the RC3; then, switching to 4.2.3.2.2; if the overwriting request sending timer of the RC3 is overtime and m3 is equal to M, the overwriting request of the RC3 being failed, sending "operation failure" and an operation failure cause that "the overwriting request messaging is failed to send" to the display module, and displaying, by the display module, the "operation failure" and the operation failure cause; then, switching to step 5;

4.2.3.2.3: determining, by the resource transaction module of the resource issuer of the RC3, whether an overwriting request reply message rc_overwrite1_reply of the RC3 sent from the resource transaction module of the certificate holder is received, if the rc_overwrite1_reply is not received, sending, by the resource transaction module of the resource issuer, "operation failure" and an operation failure cause that "the overwriting request reply message sent from the resource transaction module of the resource receiver is not received" to the display module; then, switching to step 5; if the rc_overwrite1_reply is received, checking a format and a content of the rc_overwrite1_reply, if the format is wrong, discarding the message, sending, by the resource transaction module of the resource issuer, "operation failure" and an operation failure cause that "the format of the overwriting request reply message is wrong" to the display module; then, switching to step 5; if the format is correct, checking the rc_overwrite1_reply, if the rc_overwrite1_reply is to reject the overwriting operation request, sending "operation failure" and an operation failure cause that "the certificate holder disagrees the operation" to the display module, and displaying, by the display module, the "operation failure" and the operation failure cause; then, switching to step 5; and if the reply message in the rc_overwrite1_reply is to agree the operation request, then executing 4.2.3.3;

4.2.3.3: constructing, by the resource transaction module of the resource issuer of the RC3, an RC3 overwriting message rc_overwrite1 according to the resource transaction structure, and sending, by the resource transaction module of the resource issuer of the RC3, the rc_overwrite1 to the resource transaction module of the resource receiver through the blockchain network;

4.2.3.4: if the resource transaction module of the resource receiver receives the rc_overwrite1 sent from the resource transaction module of the resource issuer, replacing, by the resource transaction module of the resource receiver, the RC3 to be overwritten with RC3' according to the transaction type and the transaction content, the transaction being successful at the moment; and modifying, by the resource transaction module of the resource receiver, the resource tree: modifying information of a resource certificate domain of a node where the resource certificate RC3 is located, i.e., replacing the resource certificate domain with information of the RC3', recording, by the resource transaction module of the resource receiver, the transaction in the distributed ledger, and meanwhile, sending, by the resource transaction module of the resource receiver, a transaction success message to the resource transaction module of the resource issuer; then, switching to 4.2.3.5; otherwise, sending, by the resource transaction module of the resource issuer, a transaction failure message; then, switching to 4.2.3.6;

4.2.3.5: if the resource transaction module of the resource issuer of the RC3 receives the transaction success message sent from the resource transaction module of the resource receiver, and sends "transaction success" to the display module, displaying, by the display module, the "transaction success"; then, switching to step 5;

4.2.3.6: if the resource issuer of the RC3 receives the transaction failure message, sending "operation failure" and an operation failure cause that "the resource receiver fails to overwrite the certificate" to the display module, and displaying, by the display module, the "operation failure" and the operation failure cause; then, switching to step 5;

4.2.4: at the moment, the resource transaction module of the resource transaction application client receiving the message of modifying the RC4 related to resource allocation adjustment from the resource issuer, the resource transaction module of the resource issuer needing to revoke the old certificate RC4, and then setting and issuing a new certificate RC5 according to the message of modifying via a method comprising:

4.2.4.1: revoking the RC4 according to the certificate revoking method in 4.2.2;

4.2.4.2: setting an instruction of issuing the new certificate RC5 according to the message of modifying, and issuing the RC5 according to the certificate issuing method in 4.2.1; and switching to step 5;

4.2.5: at the moment, the resource transaction module of the resource transaction client receiving the message issued by the ROA1 from the resource issuer, and issuing the ROA1 according to the ROA issuing method in 4.2.5.1 to 4.2.5.7:

4.2.5.1: setting, by a resource transaction module of a resource issuer of the ROA1, an ROA1 issuing instruction, wherein contents of the ROA1 issuing instruction comprise the pre-issued IP address prefix and AS number;

4.2.5.2: checking, by the resource transaction module of the resource issuer of the ROA1, whether the IP address prefix and the AS number contained in the ROA1 are possessed by the resource issuer of the ROA1 according to an IP address prefix and an AS number in the ROA1 issuing instruction, i.e., checking whether the IP address prefix and the AS number contained in the pre-issued ROA1 pre-issued are contained in an IP address prefix and an AS number bound to the resource certificate possessed by the resource issuer of the ROA1; if not contained, then a conflict occurs, switching to 4.2.5.2.2; and if contained, then no conflict occurs, switching to 4.2.5.2.1;

4.2.5.2.1: checking, by the resource transaction module of the resource issuer of the ROA1, whether the pre-issued IP address prefix and AS number resource are already issued, querying the ROA transaction record of the resource issuer of the ROA1 recorded in the distributed ledger, obtaining all the ROAs already issued by the resource issuer of the ROA1, and checking whether the IP address prefixes and the AS numbers contained in all the issued ROAs are overlapped with the pre-issued IP address prefix and AS number by comparison; if overlapped, then a conflict occurs, switching to 4.2.5.2.3; and if no conflict occurs, switching to 4.2.5.3;

4.2.5.2.2: sending, by the resource transaction module of the resource issuer of the ROA1, an "operation failure" message and a cause that "a resource conflict occurs, and the IP address prefix and the AS number held by the resource issuer do not include the IP address prefix and the AS number contained in the pre-issued ROA" to the display module, and displaying, by the display module, the "operation failure" message that comprises the operation failure cause; then, switching to step 5;

4.2.5.2.3: sending, by the resource transaction module of the resource issuer of the ROA1, an "operation failure" message and a cause that "the IP address prefix and the AS number contained in the pre-issued ROA are already issued" to the display module, and displaying, by the display module, the "operation failure" message that comprises the operation failure cause;

4.2.5.2.4: checking, by the resource transaction module of the resource issuer of the ROA1, whether the instruction of "abandoning the transaction" is received from the resource issuer, if received, switching to step 5; otherwise, switching to 4.2.5.2.5;

4.2.5.2.5: determining, by the resource transaction module of the resource issuer of the ROA1, whether a revocation message of revoking the already issued ROA conflicting with the ROA1 is received from the resource issuer; if the revocation message is received, then revoking the already issued ROA conflicting with the pre-issued ROA1; then, switching to 4.2.5.2; and if the revocation message is not received, switching to step 5;

4.2.5.3: if a checking result is that no conflict occurs, sending, by the resource transaction module of the resource issuer of the ROA1, the IP address prefix and the AS number in the ROA1 issuing instruction to the resource certificate generating module of the resource issuer; and generating, by the resource certificate generating module of the resource issuer, the ROA1 according to contents of the ROA1 issuing instruction;

4.2.5.4: constructing, by the resource transaction module of the resource issuer of the ROA1, an ROA1 issuance transaction message roa_issue according to the defined resource transaction structure, and sending, by the resource transaction module of the resource issuer of the ROA1, the ROA1 issuance transaction message roa_issue to the resource receiver through the blockchain network;

4.2.5.5: if the resource transaction module of the resource receiver receives the roa_issue sent from the resource transaction module of the resource issuer of the ROA1, parsing the message to obtain the transaction type and the transaction content, the transaction being successful at the moment, recording, by the resource transaction module of the resource receiver, the transaction in the distributed ledger, and sending, by the resource transaction module of the resource receiver, a transaction success message to the resource transaction module of the resource issuer; then, switching to 4.2.5.6; if the transaction is unsuccessful, sending, by the resource transaction module of the resource receiver, a transaction failure message to the resource transaction module of the resource issuer; then, switching to 4.2.5.7;

4.2.2.6: if the resource issuer of the ROA1 receives the transaction success message from the resource receiver, sending "transaction success" to the display module, and displaying, by the display module, the "transaction success"; then, switching to step 5;

4.2.5.7: if the resource issuer of the ROA1 receives the transaction failure message from the resource receiver, deleting, by the resource transaction module of the resource issuer of the ROA1, the ROA1, and sending an operation failure message and an operation failure cause that the "the resource receiver fails to acquire the transaction content" to the display module, and displaying, by the display module, the "operation failure" and the operation failure cause; then, switching to step 5;

4.2.6: at the moment, the resource transaction module of the resource transaction client receiving an ROA2 revocation message from the resource issuer, and revoking the ROA2 according to the ROA revoking method in 4.2.6.1 to 4.2.6.5:

4.2.6.1: setting, by a resource transaction module of the resource transaction application client of a resource issuer of the ROA2, an ROA2 revoking instruction, wherein the ROA2 revoking instruction comprises a holder of the ROA2 and an identifier of the ROA2, and sending a specific content of the ROA2 to the display module, and displaying, by the display module, the specific content of the ROA2;

4.2.6.2: constructing, by the resource transaction module of the resource issuer of the ROA2, an ROA2 revocation transaction message roa_revoke according to the defined resource transaction structure, and sending, by the resource transaction module of the resource issuer, the roa_revoke to the resource transaction module of the resource receiver through the blockchain network;

4.2.6.3: if the resource transaction module of the resource receiver receives the roa_revoke sent from the resource transaction module of the resource issuer, parsing the message to obtain the transaction type, i.e., the ROA2 revocation and the transaction content, i.e., the specific content of the ROA2, and deleting, by the resource transaction module of the resource receiver, the ROA2, the transaction being successful at the moment, and sending, by the resource transaction module of the resource receiver, a transaction success message to the resource transaction module of the resource issuer; then, switching to 4.2.6.4; if the transaction is unsuccessful, sending, by the resource transaction module of the resource receiver, a transaction failure message to the resource transaction module of the resource issuer; then, switching to 4.2.6.5;

4.2.6.4: if the resource transaction module of the resource issuer receives the transaction success message sent from the resource receiver, deleting, by the resource transaction module of the resource receiver, the ROA2, recording the transaction in the distributed ledger, sending "transaction success" to the display module, and displaying, by the display module, the "transaction success"; then, switching to step 5;

4.2.6.5: if the resource transaction module of the resource issuer receives the transaction failure message, sending an operation failure notification and an operation failure cause that "the resource receiver fails to delete the ROA2" to the display module, and displaying, by the display module, the "operation failure" and the operation failure cause; then, switching to step 5;

4.2.7: at the moment, the resource transaction module of the resource transaction application client receiving an ROA3 modifying instruction from the resource issuer, a resource transaction module of a resource issuer of the ROA3 needing to revoke the ROA3 first, and then generating a new ROA3' according to the modified content, and issuing a new certificate ROA3' via a method comprising:

4.2.7.1: revoking the ROA3 according to the ROA revoking method in 4.2.6; and

4.2.7.2: generating the new ROA3' according to the modified content, issuing the ROA3' according to the ROA issuing method in 4.3.5; then, switching to step 5; and step 5: switching to 4.2.

2. The method for the bidirectional authorization of the blockchain-based resource public key infrastructure according to claim 1, wherein contents of the resource certificate RC comprise an X.509 certificate of RFC 5280, and an IP address and an AS extension identifier of RFC 3779 are attached.

3. The method for the bidirectional authorization of the blockchain-based resource public key infrastructure according to claim 1, wherein the method in the step 4.2.1.2.1.2 for checking whether the $IP_{prefix\ 1}$ and the AS1 contained in the pre-issued certificate RC1 are already issued is to check whether the IP address prefix and the AS number contained in the resource certificate already issued by the resource issuer contain the $IP_{prefix\ 1}$ and the AS1, wherein the specific method comprises:

4.2.1.2.1.2.1: letting the node variable $v=V_0$;

4.2.1.2.1.2.2: checking the value in the child certificate identifier domain of the v; if the value is NULL, the checking result being "not issued", and ending the step; if the value is not NULL, finding a node where the resource issuer is located via a method comprising: obtaining the child node v1 by the value in the child certificate identifier domain of the v, determining whether the value of the resource certificate domain of the v1 is just the RC1 held by the resource issuer; if the values are equal, the node v1 being the node where the resource issuer is located, switching to 4.2.1.2.1.2.4; if the values are not equal, switching to 4.2.1.2.1.2.3;

4.2.1.2.1.2.3: letting v=v1; then, switching to 4.2.1.2.1.2.2; and

4.2.1.2.1.2.4: obtaining a child node v2 of the v1 through the child certificate identifier domain of the node v1, parsing, by the resource transaction module of the resource issuer, a resource certificate RCv2 held by the child node v2, checking whether an IP address prefix and an AS number contained in the RCv2 are overlapped with the pre-issued $IP_{prefix\ 1}$ and AS1 by comparison; if overlapped, indicating that the pre-issued $IP_{prefix\ 1}$ and AS1 are already issued, a conflict occurs, and a checking result is that "the pre-issued $IP_{prefix\ 1}$ and AS1 are already issued, resulting a conflict", and ending the step; if not overlapped, indicating that the pre-issued $IP_{prefix\ 1}$ and AS1 are not issued, and a checking result is "not issued", and ending the step.

4. The method for the bidirectional authorization of the blockchain-based resource public key infrastructure according to claim 1, wherein the method in the step 4.2.1.2.3 for revoking the issued RC conflicting with the pre-issued RC1 is the certificate revoking method in 4.2.2.

5. The method for the bidirectional authorization of the blockchain-based resource public key infrastructure according to claim 1, wherein the maximum number of resending times M is less than or equal to 16.

6. The method for the bidirectional authorization of the blockchain-based resource public key infrastructure according to claim 1, wherein the method in the step 4.2.1.7 for the resource transaction module of the resource receiver to create the RC1 node for the resource tree comprises:

4.2.1.7.1: overwriting information of a parent node of the RC1 node, i.e., the node where the certificate $RC_{issuer}$ held by the resource issuer is located, and adding a child certificate identifier to the child certificate identifier domain, wherein the child certificate identifier points to the new node RC1; and

4.2.1.7.2: creating the new node RC1 and filling in information of each domain: a resource issuer domain of the RC1 node is the IP address $IP_{issuer\ 1}$ of the resource issuer of the RC1, a resource receiver domain is the IP address $IP_{receiver\ 1}$ of the resource receiver of the RC1, a content of the resource certificate domain is the RC1, and the parent certificate identifier domain points to the node where the resource certificate RC held by the resource issuer of the RC1 is located, the child certificate identifier domain is NULL, and the IP address prefix and the AS number contained in the certificate are obtained by parsing the RC1 via the resource transaction module.

7. The method for the bidirectional authorization of the blockchain-based resource public key infrastructure according to claim 1, wherein contents of the rc_issue_request comprise an issued certificate, a certificate identifier possessed by the parent certificate, i.e., the resource issuer, a random number r, and the address of the resource receiver; contents of the rc_issue_reply comprise a received message, whether an operation of the resource issuer is agreed, and a random number; and contents of the rc_issue comprise the resource issuer, i.e., the issuer of the RC1, the resource receiver, i.e., the receiver of the RC1, the transaction type, i.e., the RC1 issuance, the transaction content, i.e., the specific content of the RC1, the transaction attributes, i.e., the transfer attribute and the expired attribute, the transaction evidence, i.e., the rc_issue_reply message and a random number+1 issued by the receiver of the RC, and a signature of the resource issuer of the RC1 on the transaction.

8. The method for the bidirectional authorization of the blockchain-based resource public key infrastructure according to claim 1, wherein contents of the rc_revoke_request comprise a certificate identifier to be revoked, a random number r, and an address of the certificate holder; contents of the rc_revoke_reply comprise the message rc_revoke_request received by the resource receiver, whether the operation of the resource issuer is agreed, and a random number; the revocation transaction message rc_revoke comprises the resource issuer, i.e., the issuer of the RC2, the transaction receiver, i.e., the holder of the RC2, the transaction type, i.e., the RC2 revocation, the transaction content, i.e., the specific content of the RC2, the transaction attribute, the transaction evidence, i.e., the rc_revoke_reply message, a random number+1 issued by the holder of the RC2, and a signature of the resource issuer of the RC2 on the transaction; and the transaction attribute at the moment is NULL.

9. The method for the bidirectional authorization of the blockchain-based resource public key infrastructure according to claim 1, wherein the attribute values capable of being modified by the overwriting operation in 4.2.3.1 comprise certificate expiration time and an integer serial number.

10. The method for the bidirectional authorization of the blockchain-based resource public key infrastructure according to claim 1, wherein contents of the rc_overwrite1_request comprise a certificate identifier to be modified, a random number r, and an ID of the certificate holder; contents of the rc_overwrite1_reply comprise the message rc_overwriter1_request received by the resource receiver, whether an operation of the resource issuer is agreed, and a random number; and the rc_overwrite1 comprises the resource issuer, i.e., the issuer of the RC3, the resource receiver, i.e., the holder of the RC3, the transaction type, i.e., the RC3 overwriting, the transaction content, i.e., the modified content RC3' of the certificate RC3 to be modified, the transaction attributes, i.e., the transfer attribute and the expired attribute, the transaction evidence, i.e., rc_overwrite1_reply message, a random number+1 issued by the holder of the RC3, and a signature of the resource issuer of the RC3 on the transaction.

11. The method for the bidirectional authorization of the blockchain-based resource public key infrastructure according to claim 1, wherein contents of the roa_issue comprise the resource issuer, i.e., the issuer of the ROA1, the resource receiver, i.e., the receiver of the ROA1, the transaction type, i.e., the ROA1 issuance, the transaction content, i.e., the specific content of the ROA1, the transaction attribute, the transaction evidence, and a signature of the resource issuer of the ROA1 on the transaction; when the transfer attribute in the transaction attribute is NULL, the expired attribute indicates whether the ROA has a time limit, and the transaction evidence at the moment is NULL.

12. The method for the bidirectional authorization of the blockchain-based resource public key infrastructure according to claim 1, wherein contents of the roa_revoke comprise the resource issuer, i.e., the issuer of the ROA2, the resource receiver, i.e., the holder of the ROA2, the transaction type, i.e., the ROA2 revocation, the transaction content, i.e., the identifier of the ROA2, the transaction attribute, and the transaction evidence, wherein both the transaction attribute and the transaction evidence at the moment are NULL.

13. The method for the bidirectional authorization of the blockchain-based resource public key infrastructure according to claim 1, wherein the method in the step 4.2.5.2.5 for revoking the already issued ROA conflicting with the pre-issued ROA1 is the ROA revoking method in 4.2.6.

* * * * *